(12) United States Patent
Martin et al.

(10) Patent No.: US 11,716,923 B2
(45) Date of Patent: Aug. 8, 2023

(54) ROW CLEANER/CLOSING WHEEL

(71) Applicants: Ronald Steve Martin, Elkton, KY (US); Asghar Rezasoltani, Bowling Green, KY (US)

(72) Inventors: Ronald Steve Martin, Elkton, KY (US); Asghar Rezasoltani, Bowling Green, KY (US)

(73) Assignee: Ronald Steve Martin, Elkton, KY (US)

( * ) Notice: Subject to any disclaimer, the term of this patent is extended or adjusted under 35 U.S.C. 154(b) by 415 days.

(21) Appl. No.: 16/737,705

(22) Filed: Jan. 8, 2020

(65) Prior Publication Data

US 2020/0214192 A1 Jul. 9, 2020

Related U.S. Application Data

(63) Continuation-in-part of application No. 16/041,666, filed on Jul. 20, 2018, now Pat. No. 10,555,452.

(60) Provisional application No. 62/803,420, filed on Feb. 8, 2019, provisional application No. 62/534,824, filed on Jul. 20, 2017.

(51) Int. Cl.
*A01C 5/06* (2006.01)
*A01B 35/28* (2006.01)
*A01B 49/06* (2006.01)
*A01B 43/00* (2006.01)

(52) U.S. Cl.
CPC .............. *A01C 5/068* (2013.01); *A01B 35/28* (2013.01); *A01B 43/00* (2013.01); *A01B 49/06* (2013.01)

(58) Field of Classification Search
CPC ......... A01C 5/068; A01B 35/28; A01B 43/00; A01B 49/06
See application file for complete search history.

(56) References Cited

U.S. PATENT DOCUMENTS

| 5,497,717 | A | * | 3/1996 | Martin | A01C 5/066 111/140 |
| 5,896,932 | A | * | 4/1999 | Bruns et al. | A01C 5/068 172/556 |
| 7,757,777 | B1 | * | 7/2010 | Wipf et al. | A01C 5/066 172/604 |
| 7,975,629 | B1 | * | 7/2011 | Martin | A01C 5/066 111/52 |
| 8,291,998 | B1 | * | 10/2012 | Berg et al. | A01C 5/066 172/604 |
| 2011/0155031 | A1 | * | 6/2011 | Arnett et al. | A01C 5/066 111/193 |
| 2016/0066497 | A1 | * | 3/2016 | Whalen | A01B 21/08 172/540 |

* cited by examiner

*Primary Examiner* — Tara Mayo-Pinnock
(74) *Attorney, Agent, or Firm* — Duncan Galloway Greenwald PLLC; Kevin T. Duncan

(57) ABSTRACT

A row cleaning/closing wheel having debris removing and/or furrow closing performance with complimentary left and right cleaning/closing wheel pairs having a sloped body portion at an angle relative to a hub base for cleaning and/or closing operation during row planting. The sloped body portion and the hub base may form a continuous curve from the center of the hub base to a set of teeth on the outer edge of the sloped body portion. The row cleaning wheel for use with a floating row cleaner and/or closing arm assemblies attached to a row planter during planting operation.

18 Claims, 19 Drawing Sheets

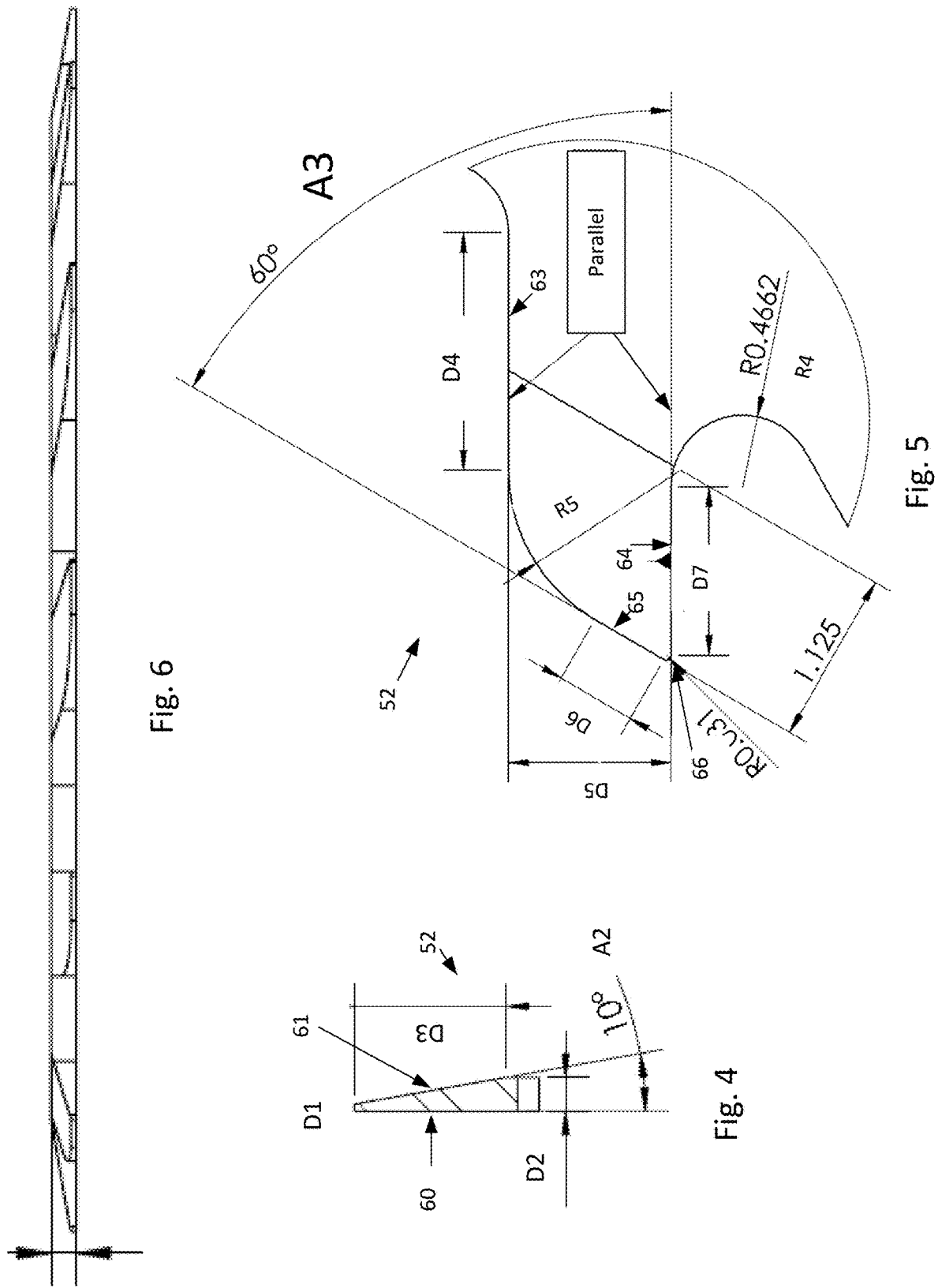

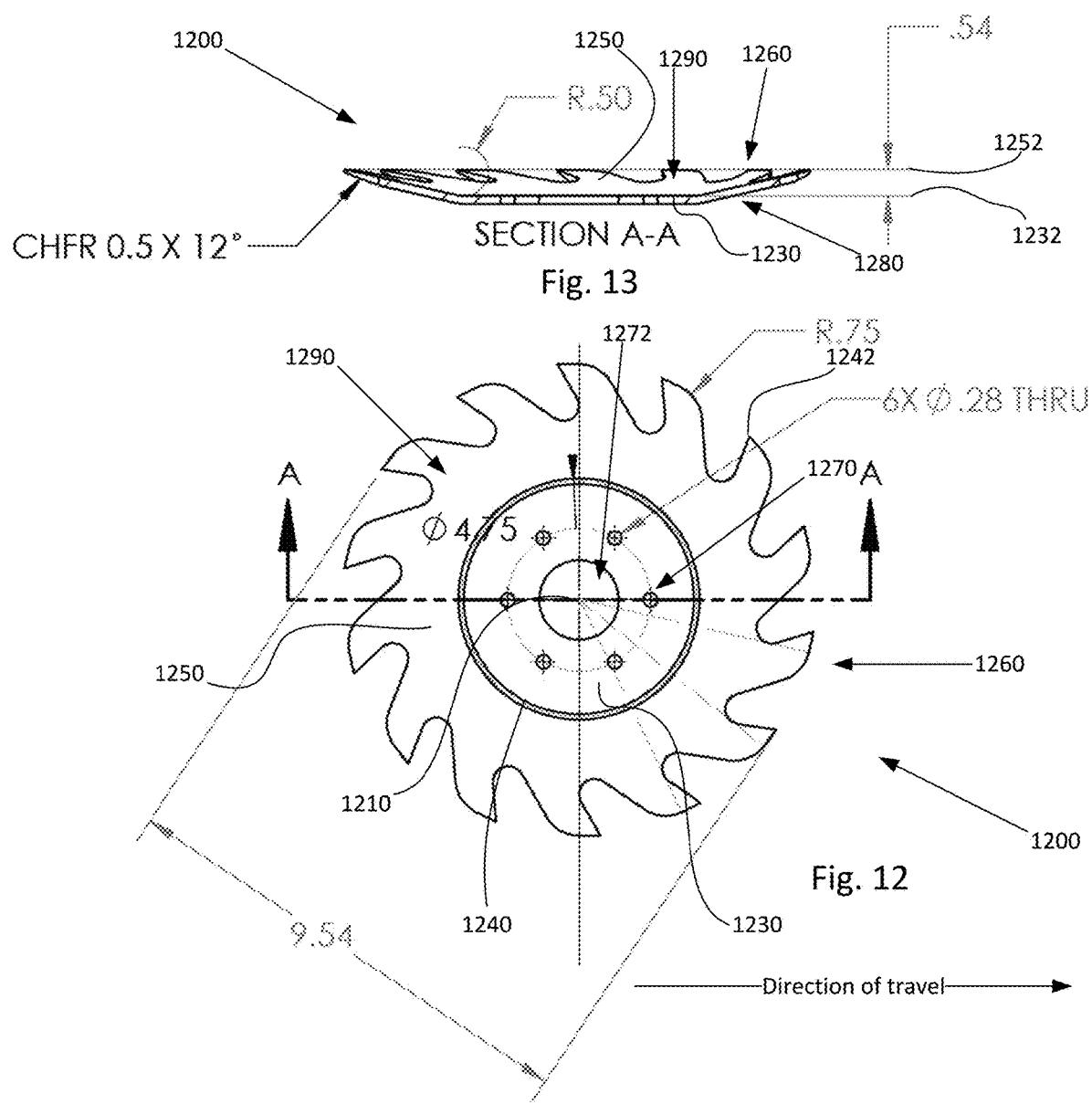

ROW CLEANER/CLOSING WHEEL

CROSS-REFERENCE TO RELATED APPLICATIONS

This patent application claims benefit of priority to U.S. Provisional Patent Application Ser. No. 62/803,420, entitled IMPROVED ROW CLEANER/CLOSING WHEEL, filed Feb. 8, 2019; and the present application is a continuation-in-part of U.S. patent application Ser. No. 16/041,666, filed Jul. 20, 2018, entitled ROW CLEANER/CLOSING WHEEL, which claims benefit of priority under 35 U.S.C. § 119(e) to U.S. Provisional Patent Application Ser. No. 62/534,824 filed Jul. 20, 2017, entitled AGRICULTURAL TILLING BLADES, both of which are incorporated by reference herein in their entirety.

FIELD OF THE INVENTION

The present disclosure is generally applicable to the field of agricultural equipment, and more particularly for improved row cleaning and more particularly in no-till farming applications.

AUTHORIZATION PURSUANT TO 37 C.F.R. § 1.171 (d)(c)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

The background description includes information that may be useful in understanding the present invention. It is not an admission that any of the information provided herein is prior art or relevant to the presently claimed invention, or that any publication specifically or implicitly referenced is prior art.

In traditional and longstanding farming methods, tilling or tillage is typically used before planting to prepare a field. Tilling a field has both herbicidal and insecticidal benefits and may serve to break up the earth to enable seedlings to more easily extend root systems. However, there are downsides to tillage that are driving modern farmers towards "low-till" or "no-till" farming systems. In these farming systems, plant matter left over from previous harvests, called residue, is left in the fields between plantings. At the time of planting, a row cleaner system is used with a planter to clear only a small portion or strip of earth of the residue to enable seeds and fertilizer to be placed in the ground. The row cleaner removes the residue and only very lightly tills the topmost soil or earth to provide for a clear path for seed and fertilizer placement.

No-till farming systems provide for benefits including increased water retention and absorption, and increased presence of beneficial fungi, bacteria, and fauna (e.g., earthworms). The use of a no-till farming system has the additional benefit of reducing topsoil erosion that may be caused by tilling. In no-till systems it has also been shown that because water retention is greater and soil erosion is reduced, the environmental impact from the runoff of fertilizer, herbicides, and pesticides is also reduced.

The movement towards no-till farming systems has driven the improvement of row cleaner apparatuses for planting systems. Existing row cleaner systems include fixed row cleaners, adjustable row cleaners, and floating row cleaners and a variety of row cleaner wheels. One problem with existing row cleaning wheel designs is that residue or debris follow the rotating wheel on the surfaces of the teeth, which is unwanted as it causes clogging and lowers overall performance.

What is needed is a row cleaner wheel configured and adapted to avoid excessive soil and ground debris from following and traveling with the rotation of the wheel during planting operation to avoid clogging and other detrimental effects when used in a row planter or plater system. What is further needed is a row cleaning or closing wheel adapted to provide for improved row closing or cleaning action when installed in a manner where the teeth of the wheels do not intermesh.

SUMMARY OF THE INVENTION

The present invention provides an improved row cleaning/closing wheel configured in a beneficial way to avoid undesired collection of debris during operation of a row planter when mounted on a row cleaner assembly. The inventive row closing wheel may also or additionally used at the rear end of the row planter for assisting in closing furrows at the end of row planter operation.

The row cleaning/closing wheel of the present invention may have a generally "cupped" or "bowl" shape wherein the body of the wheel is either sloped from an inner to an outer circumference or continuously arched, curved, or radiused from a central point to an outer circumference. The shape of the row closing/cleaning wheel may be concave or convex depending on how the row closing/cleaning wheel is installed on a respective row closing or row cleaning frame on a planter.

In a first embodiment, the present invention provides a row cleaner wheel assembly for mounting to a row cleaner assembly of a row planter, the row cleaner wheel assembly comprising: a row cleaner wheel mount assembly having a first portion adapted to be mounted to a row cleaner assembly and a second portion adapted for mounting one or more row cleaner wheels; a first row cleaning wheel being substantially circular with a circular center hub opening for mounting the first row cleaning wheel to the row cleaner wheel mount assembly and having a first set of teeth arranged about the outer circumference of the first row cleaning wheel; wherein each of the first set of teeth include a tooth body extending outward along the periphery of the first row cleaning wheel and having an essentially flat surface and a beveled surface that are relatively narrower at a distal end of the tooth and wider proximally toward the center of the row cleaning wheel, each tooth having a profile characterized by essentially parallel lines substantially along the length of the tooth body, wherein during operation of a row planter the parallel lines are essentially parallel with a ground surface when rotating and exiting the ground surface so as to deter debris and soil material from collecting on the surface of the tooth.

The row cleaner assembly may further comprise: a second row cleaning wheel being substantially circular and mounted to the row cleaner wheel mount assembly and having a second set of teeth arranged about the outer circumference of the second row cleaning wheel; wherein the first and second row cleaning wheels are disposed on the row cleaner mount assembly spatially removed at respective centers and having essentially equal diameters, disposed on the row cleaner mount assembly to be oppositely facing and angled toward one another proximal to a ground surface and angled outwardly away from one another distal to the ground surface, the relative angle being adapted to allow the first and second sets of teeth to intermesh when rotated in unison during operation of a row planter.

The row cleaner assembly may be further characterized by one or more of the following features: wherein the relative angle is approximately 60 degrees; wherein the first set of teeth comprise 12 teeth separated sequentially by approximately 30 degrees relative to the center of the row cleaner wheels; wherein the tooth profile includes a generally radiused outward surface extending outward-most from the row cleaner wheel and intermediate the parallel lines; wherein the tooth profile includes generally radiused transitions from the outer periphery of the row cleaner wheel; wherein the beveled surfaces of the first and second sets of teeth operate to provide a cleaning action at the intersection of the teeth during row planter operation; further comprising a second row cleaner wheel, wherein the first and second row cleaner wheels are attached to said row cleaner wheel mount assembly so that the first and second row cleaner wheels are intersectedly positioned; wherein the first and second row cleaner wheels are non-intersectedly positioned during an initial engagement with a ground surface.

In a second embodiment, the present invention provides A row cleaning wheel for mounting to a row cleaning assembly for use in operation of a row planter and adapted to remove debris, the row cleaning wheel comprising: a substantially circular body portion; a circular center hub opening disposed at the center of the circular body portion for positioning the row cleaner wheel on a hub of a row cleaner mount assembly; a set of holes for receiving fastening members for mounting the row cleaning wheel to a row cleaner wheel mount assembly; and a first set of teeth arranged about the outer circumference of the circular body portion; wherein each of the first set of teeth include a tooth body extending outward along the periphery of the first row cleaning wheel and having an essentially flat surface and a beveled surface that are relatively narrower at a distal end of the tooth and wider proximally toward the center of the row cleaning wheel, each tooth having a profile characterized by essentially parallel lines substantially along the length of the tooth body, wherein during operation of a row planter the parallel lines are essentially parallel with a ground surface when rotating and exiting the ground surface so as to deter debris and soil material from collecting on the surface of the tooth.

In a third embodiment, the present invention provides a row cleaner/closer wheel assembly for mounting to a row cleaner/closer assembly of a row planter, the row cleaner/closer wheel assembly comprising: a row cleaner/closer wheel mount assembly having a first portion adapted to be mounted to a row cleaner/closer assembly and a second portion adapted for mounting one or more row cleaner/closer wheels; a first row cleaner/closer wheel being substantially circular with a center, a front, a back, an inner circumference, and an outer circumference and comprising: a center hub base being a minor diameter on a first plane and defined by the inner circumference, the center hub base having a circular center hub opening at the center for mounting the first row cleaner/closer wheel to the row cleaner/closer wheel mount assembly; a sloped body portion being a portion of a major diameter of the first row cleaner/closer wheel between the inner circumference and the outer circumference, the outer circumference being at a second plane offset from the inner circumference and the first plane relative to the front of the first row cleaner/closer wheel, the sloped body portion being at a slope angle relative to the first plane; and a first set of teeth arranged about the outer circumference of the first row cleaner/closer wheel.

The slope angle may be 13 degrees. The slope angle may be 15 degrees. The offset of the outer circumference relative from the inner circumference relative to the first plane may be 0.54 inches. The major diameter may be 9.54 inches. The minor diameter may be 4.75 inches. The center hub base and the sloped body portion may form a gradual and continuous curve from the first plane to the second plane. The gradual and continuous curve from the first plane to the second plane may be defined by a minor arc of a circle. The row cleaner/closer assembly may further comprise a second row cleaner/closer wheel. Each of the first set of teeth may include a tooth body extending outward along the periphery of the first row cleaner/closer wheel and having an essentially flat surface and a beveled surface that are relatively narrower at a distal end of the tooth and wider proximally toward the center of the row cleaner/closer wheel, each tooth having a profile characterized by essentially parallel lines substantially along the length of the tooth body, wherein during operation of a row planter the parallel lines are essentially parallel with a ground surface when rotating and exiting the ground surface so as to deter debris and soil material from collecting on the surface of the tooth. The first set of teeth may comprise 12 teeth separated sequentially by approximately 30 degrees relative to the center of the row cleaner/closer wheel.

In a fourth embodiment, the present invention provides a row cleaner/closer wheel for mounting to a row cleaner/closer assembly for use in operation of a row planter and adapted to cleaner/closer a planting row, the row cleaner/closer wheel comprising: a center, a front, a back, an inner circumference, and an outer circumference; a center hub base being a minor diameter on a first plane and defined by the inner circumference, the center hub base having a circular center hub opening at the center for mounting the row cleaner/closer wheel to a row cleaner/closer wheel mount assembly; a sloped body portion being a portion of a major diameter of the row cleaner/closer wheel between the inner circumference and the outer circumference, the outer circumference being at a second plane offset from the inner circumference and the first plane relative to the front of the row cleaner/closer wheel, the sloped body portion being at a slope angle relative to the first plane; and a first set of teeth arranged about the outer circumference of the first row cleaner/closer wheel.

The slope angle may be between 13 degrees and 15 degrees inclusive. The offset of the outer circumference relative from the inner circumference relative to the first plane may be 0.54 inches. The major diameter may be 9.54 inches. The minor diameter may be 4.75 inches. The center hub base and the sloped body portion may form a gradual and continuous curve from the first plane to the second plane. The gradual and continuous curve from the first plane to the second plane may be defined by a minor arc of a circle. Each of the first set of teeth may include a tooth body extending outward along the periphery of the first row cleaner/closer wheel and having an essentially flat surface and a beveled surface that are relatively narrower at a distal end of the tooth and wider proximally toward the center of the row cleaner/closer wheel, each tooth having a profile characterized by essentially parallel lines substantially along the length of the tooth body, wherein during operation of a row planter the parallel lines are essentially parallel with a ground surface when rotating and exiting the ground surface so as to deter debris and soil material from collecting on the surface of the tooth. The first set of teeth may comprise 12 teeth separated sequentially by approximately 30 degrees relative to the center of the row cleaner/closer wheel.

BRIEF DESCRIPTION OF THE FIGURES

In order that the advantages of the cleaning wheel will be readily understood, a more particular description of the cleaning wheel briefly described above will be rendered by reference to specific embodiments illustrated in the appended drawings. Understanding that these drawings depict only typical embodiments of the cleaning wheel and are not therefore to be considered limited of its scope, the cleaning wheel will be described and explained with additional specificity and detail through the use of the accompanying drawings.

FIG. 4 provides a cross-sectional view of a tooth configuration in accordance with an exemplary embodiment of the present invention.

FIG. 5 provides a side view of a portion B of the tooth configuration in accordance with an exemplary embodiment of the present invention.

FIG. 6 provides a top/bottom view showing a beveled aspect of the tooth configuration in accordance with an exemplary embodiment of the present invention.

FIG. 12 provides a front side view of a left-side row cleaning/closing wheel in accordance with the present invention.

FIG. 13 provides a side cross-section view of a left side row cleaning/closing wheel in accordance with the present invention.

DETAILED DESCRIPTION

Figure 1:
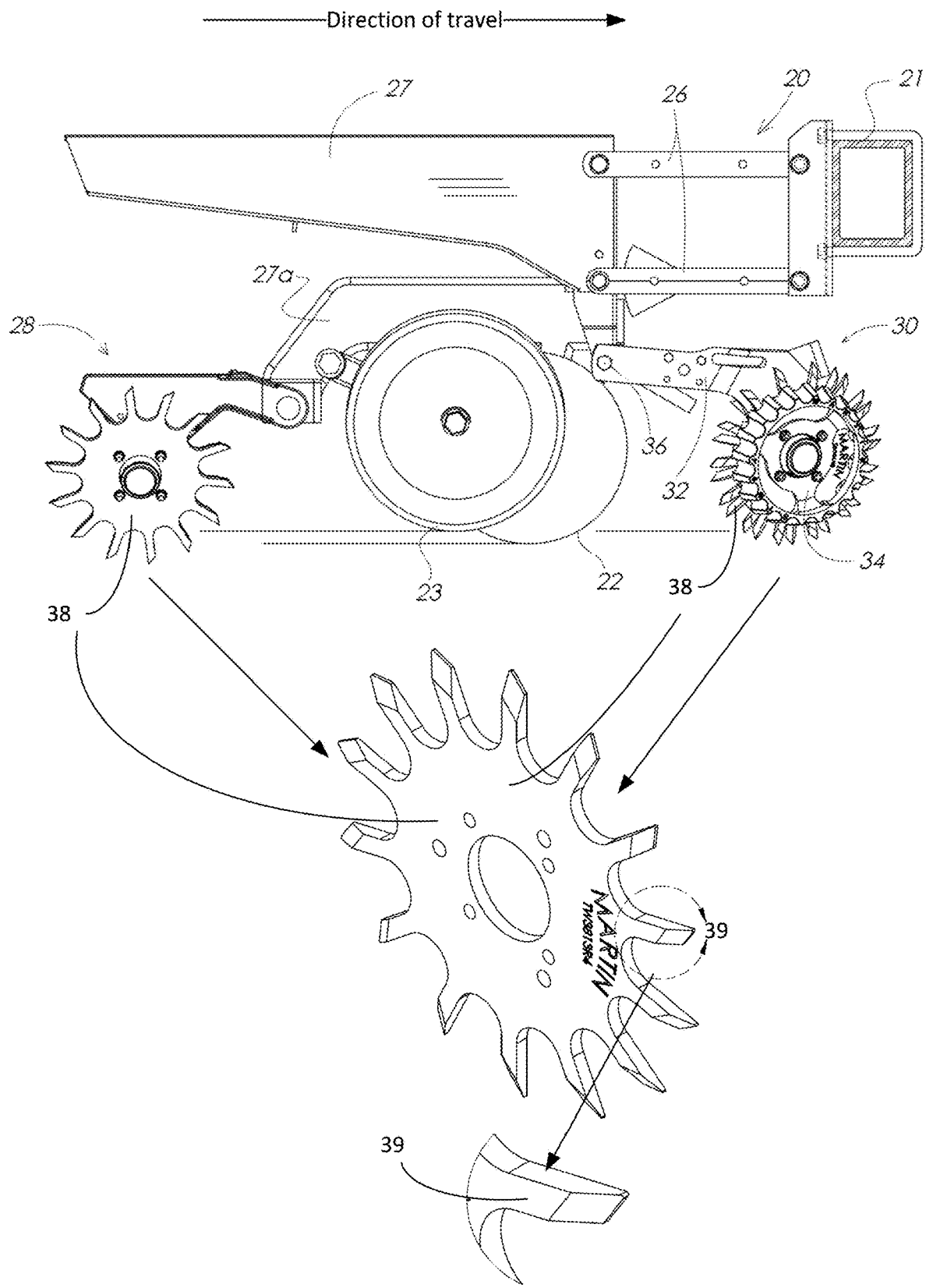
FIG. 1 illustrates a planter row unit having a front end row cleaning assembly and a rear or back end closing assembly each having a row cleaning/closing wheel as found in the prior art.

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

Referring now to the drawings, wherein like reference numerals designate identical or corresponding parts throughout the several views, FIG. 1 provides a side view of a prior art planter row unit 20 to which an embodiment of an adjustable row cleaner 30 is mounted, typically to a frame plate portion of the planter row unit 20. The row cleaner 30 is used to remove debris prior to planting of seed. Planter row units 20 are generally mounted to a tool bar 21, which may also be referred to as tow bar or towing bar, or similar structure using linkage(s) 26, which may be oriented in a parallel fashion as shown in FIG. 1, or which may be non-parallel in other embodiments not pictured herein. In operation, the planter row unit is attached to the tool or towing bar 21, which is attached to a tractor or other motorized vehicle for moving connected set of planter row units across a field for planting operation. Elevation adjustment equipment, such as hydraulic or pneumatic or electro-mechanical up/down force equipment including actuators, may be connected to the planter row unit, e.g., to act upon linkage 26 with downward and/or upward force to urge the planter row unit in a desired manner based on soil conditions and other considerations for optimum planting and furrow closing.

The planter row unit 20 generally includes a row unit frame 27 and a row unit sub-frame 27a, both of which are typically pivotally affixed to the linkages 26, which are affixed to tool or towing bar 21. As shown, four linkages 26 are provided with two on each side of the planter row unit to track up and down movement of the planter row unit relative to the towing bar 21. The row unit sub-frame 27a typically supports a furrow opener 22 (e.g., a V-shaped opening wheel or disk or blade) that operates to open a furrow in the ground surface as a prelude to placing a seed and typically fertilizer or other chemicals or fluids to promote healthy and optimal seed germination and emergence. This is critical to management for uniform plant growth and maturation to lead to desired harvesting operation and produce quality. Although not shown in the embodiments pictured herein, the planter row unit 20 often includes a down pressure member (not shown) for applying a biasing force to the furrow opener 22. The row unit sub-frame 27a also supports a depth regulator 23, which may also be referred to as a gauge wheel, which travels along the surface of the field and has a fixed relative position with the furrow opener or coulter 22 to regulate the depth of the furrow created for receiving the seed and other deliverable materials into the furrow.

A seed planter or delivery mechanism (not shown) may be mounted to the row unit frame 27 and/or row unit sub-frame 27a for delivering seed to the opened furrow. Following the furrow opener and seed planter section, a furrow closer 28 is included for closing the furrow created by the furrow opener or coulter 22 and after the seed and deliverables have been deposited in the furrow. This protects the seed after planting, promotes moisture in site, and promotes uniform and desired depth of seed.

The row unit frame 27 typically supports at least one container (not shown) for holding seed, fertilizer, or other material, however, one or more of these materials may be held in a common container for distribution across a set of planter row units. The row unit sub-frame 27a includes a row unit front plate or portion 29, which is oriented towards the direction of travel of the planter row unit 20 and to which the row cleaner assembly 30 may be attached (note in some configurations the row cleaner assembly is mounted to the towing bar 21 instead of the planter row unit front plate 29. Planter row units 20 such as those shown in FIG. 1 as well as other seeding machines are well known to those practiced in the art and the operation of such will therefore not be discussed in detail herein for reasons of clarity.

A row cleaner assembly 30 may be mounted to a planter row unit 20. The row cleaner assembly 30 as pictured herein includes a row cleaner frame 32 that is pivotally mounted to the row unit sub-frame 27a at the row unit front plate 29. The row cleaner frame 32 pivots with respect to the planter row unit 20 about a row cleaner frame pivot 36. Although in some configurations the row cleaner may be fixed relative to the planter row unit. In this exemplary embodiment, the row cleaner frame 32 extends forwardly from the row unit front plate 29, and one or a pair of row cleaner wheels 34 is pivotally affixed to the row cleaner frame 32 opposite the row cleaner frame pivot 36, which is described in more detail below. Those skilled in the art will appreciate that the row cleaner assembly 30 as disclosed may be mounted on a row unit front plate 29 through any method and/or structure known to those skilled in the art such as bolts, nuts, and corresponding apertures, chemical adhesion, clamps, welding, etc.

The row cleaner frame 32 in the first embodiment thereof is comprised of two row cleaner frame arms 32a connected to one another at the second ends thereof. The two row cleaner frame arms 32a may be oriented so that they form a line of symmetry between them in the direction of travel of the planter row unit 20. In this respect, the row cleaner frame arms 32a are shaped similarly to a wishbone or are V- or U-shaped. Each row cleaner frame arm 32a has a first and second end. The first end forms the row cleaner frame pivot 36 at the two points where the row cleaner frame arms 32a attach to the row unit front plate 29. As generally described above, the row cleaner frame arms 32a are pivotal with respect to the row unit sub-frame 27a about the row cleaner frame pivot 36 so that the row cleaner assembly is floating or semi-floating, as is known to those skilled in the art. A more detailed description of a compact floating row cleaner apparatus is found at US Pat. No. 10,159,175 (Martin), the entirety of which is expressly incorporated herein by reference.

The row cleaner frame arms 32a come together and are attached to one another at their second ends to form one contiguous row cleaner frame 32 as shown in the embodiments pictured herein. In the embodiments pictured herein, the connection point of the two row cleaner frame arms 32a is shaped similarly to an upside-down U. In other embodiments not shown herein, the connection point will be oriented differently and may have a different shape. For example, the connection point of the row cleaner frame arms 32a may be a substantially flat piece of material simply connecting the second ends of the row cleaner frame arms 32a. As those skilled in the art will appreciate, depending on the orientation of the row cleaner wheels 34 (explained in detail below) and row cleaner frame arms 32a, the connection point may have different shapes and/or orientations than the connection points pictured herein without departing from the scope of the adjustable row cleaner 10.

A row cleaner wheel combination 34/38, may be a unitary or assembled or joined row cleaning wheel 38/side treader (gauge or depth) wheel 34 and may be mounted at the second end of each row cleaner frame arm 32a. The row cleaner wheel 34/38 is rotationally mounted to the row cleaner frame 32, e.g., each wheel may be mounted to a tab or ear that extends from the frame by way of a row cleaner wheel hub that is either attached to or integrated into the row cleaner frame 32. The row cleaner wheel 34/38, row cleaner wheel hub (if so configured), and row cleaner frame arms 32a are configured so that the row cleaner wheel 34/38 is free to rotate about the row cleaner frame arms 32a. The operation and benefits of ground driven row cleaner wheels 34/38 with teeth 39 is well known to those skilled in the art and will not be described further herein for purposes of clarity. A coulter may be mounted between the row cleaner frame arms 32a without interference with the operation of any elements of the planter row unit 20. Other accessory tools may also be mounted between the row cleaner frame arms 32a in embodiments not pictured herein.

Row cleaner assemblies 30 having a single row cleaner wheel 34/38 mounted thereto may be used with the adjustable row cleaner 10 as disclosed herein without limitation. The adjustable row cleaner 10 as disclosed and claimed herein may be used with any type of floating row cleaner frame 32 and is not limited to the embodiments thereof as pictured herein. For example, the adjustable row cleaner may be used with single-arm row cleaner frames (not shown) or U-shaped row cleaner frames 32 having different orientations than the one shown in the various figures herein.

Figure 9:
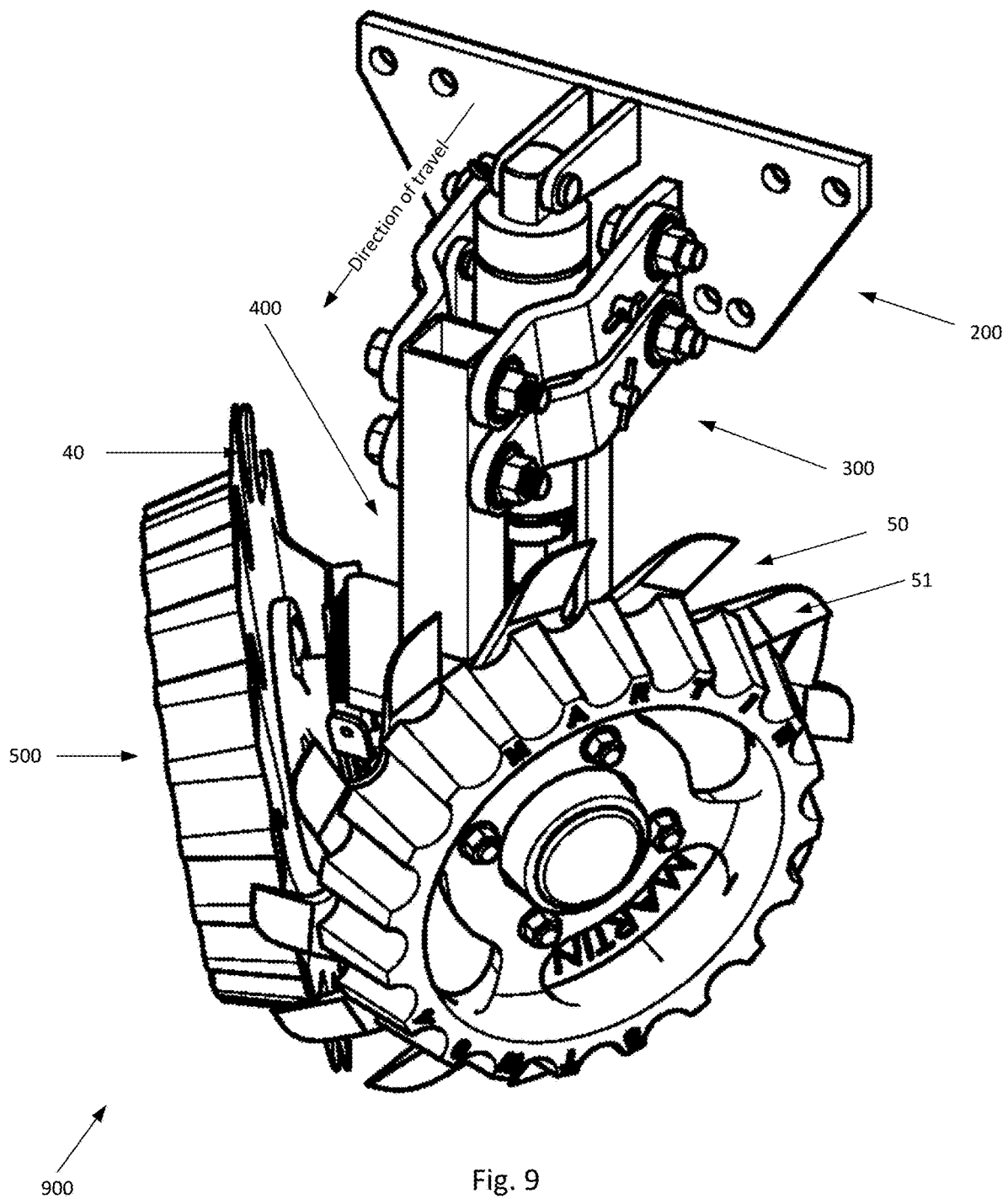
FIG. 9 provides a perspective view of a compact parallel arm row cleaner assembly including an improved row cleaner wheel according to an embodiment of the present invention.
Figure 10:
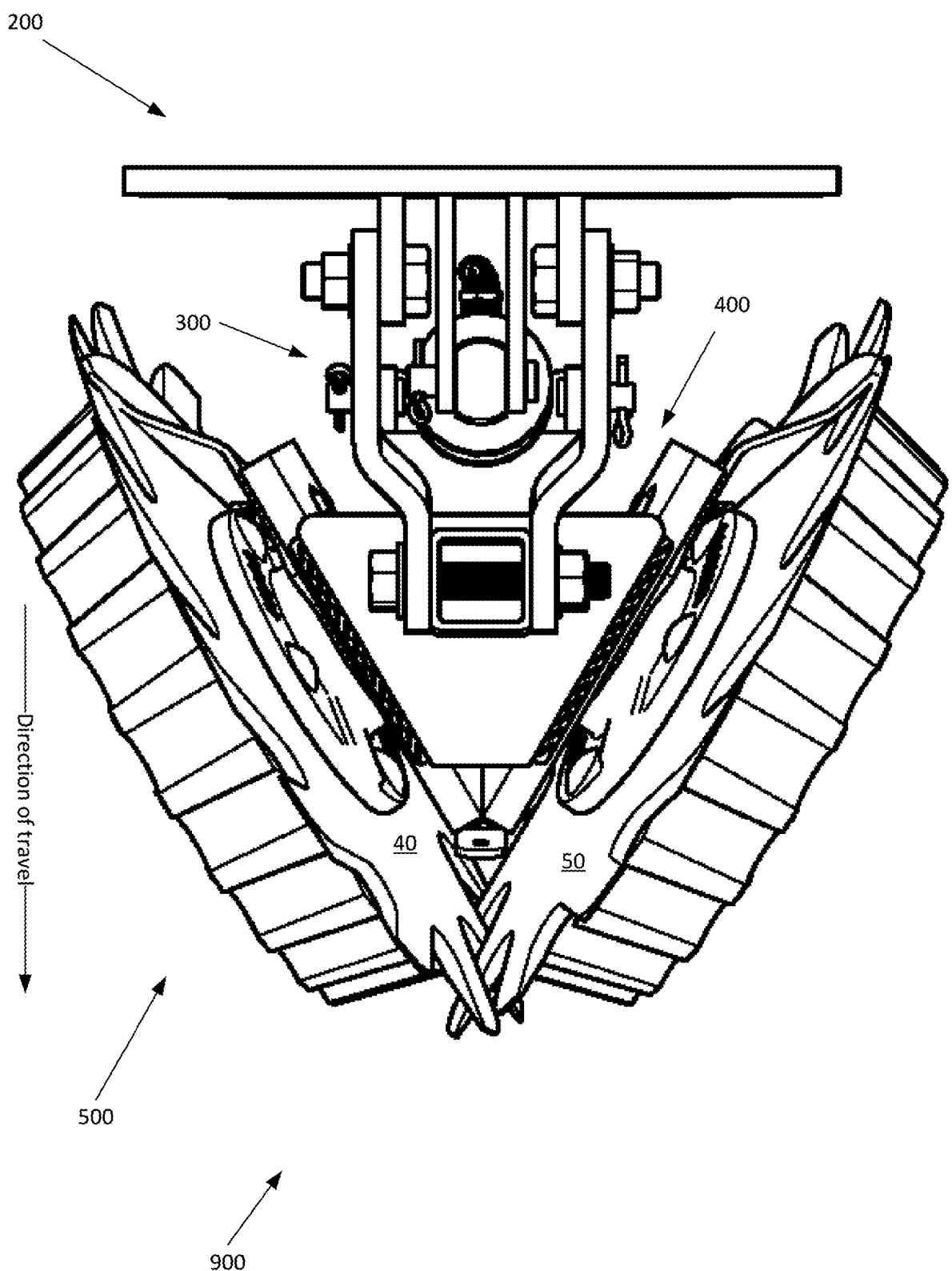
FIG. 10 provides a top view of a compact parallel arm row cleaner assembly including an improved row cleaner wheel according to an embodiment of the present invention.
Figure 11:
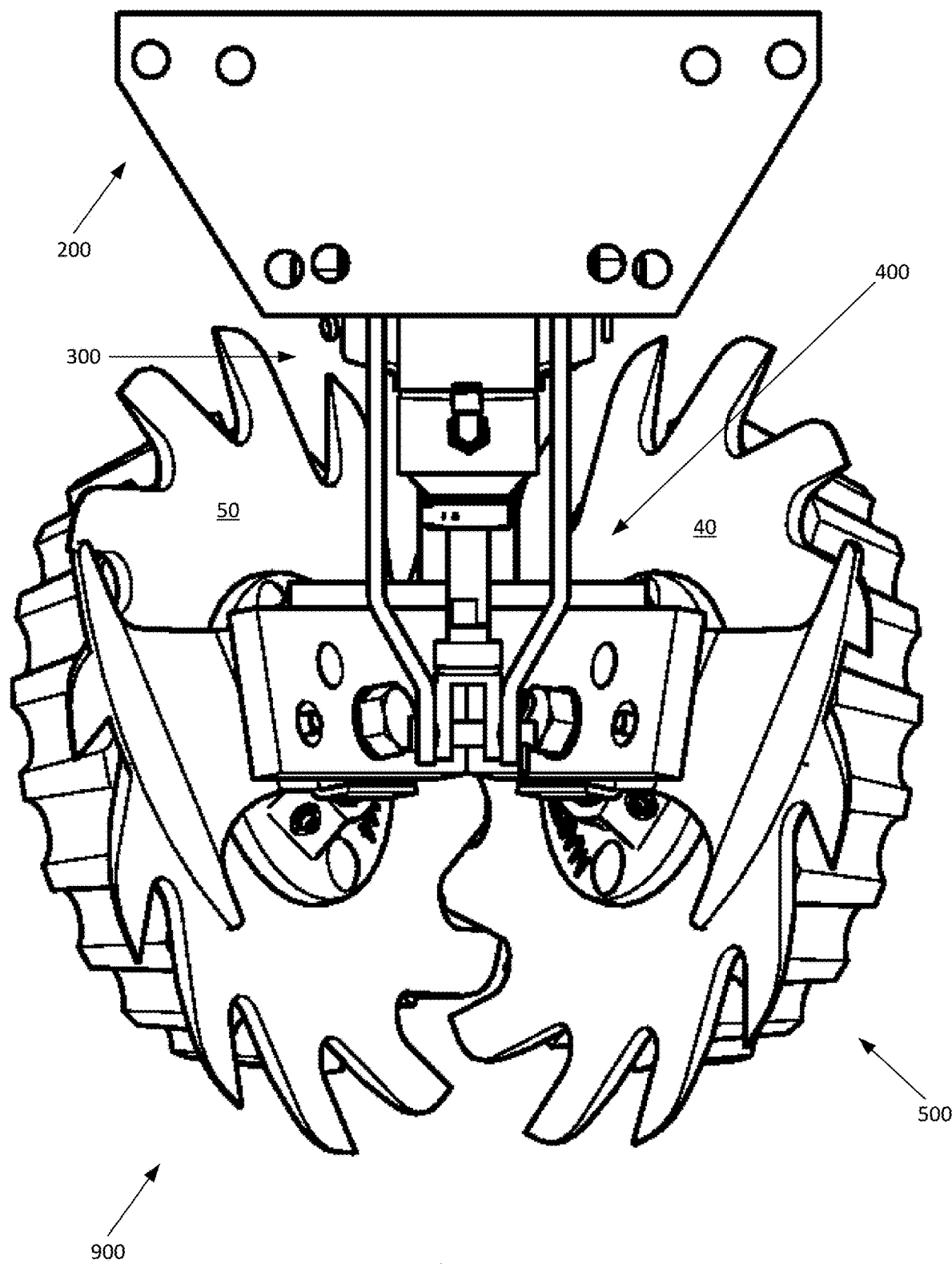
FIG. 11 provides a rear view of a compact parallel arm row cleaner assembly including an improved row cleaner wheel according to an embodiment of the present invention.
Figure 14:
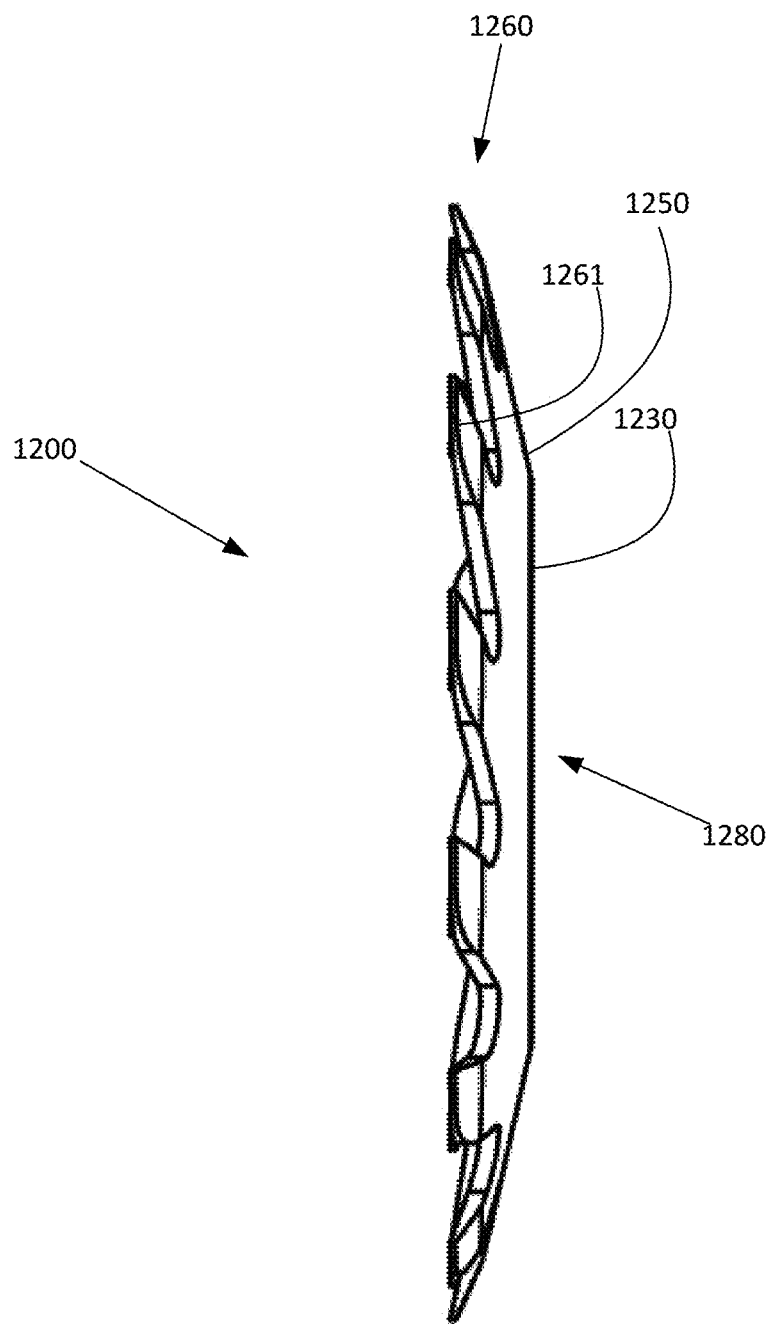
FIG. 14 provides a side view of a left side row cleaning/closing wheel in accordance with the present invention.
Figure 15:
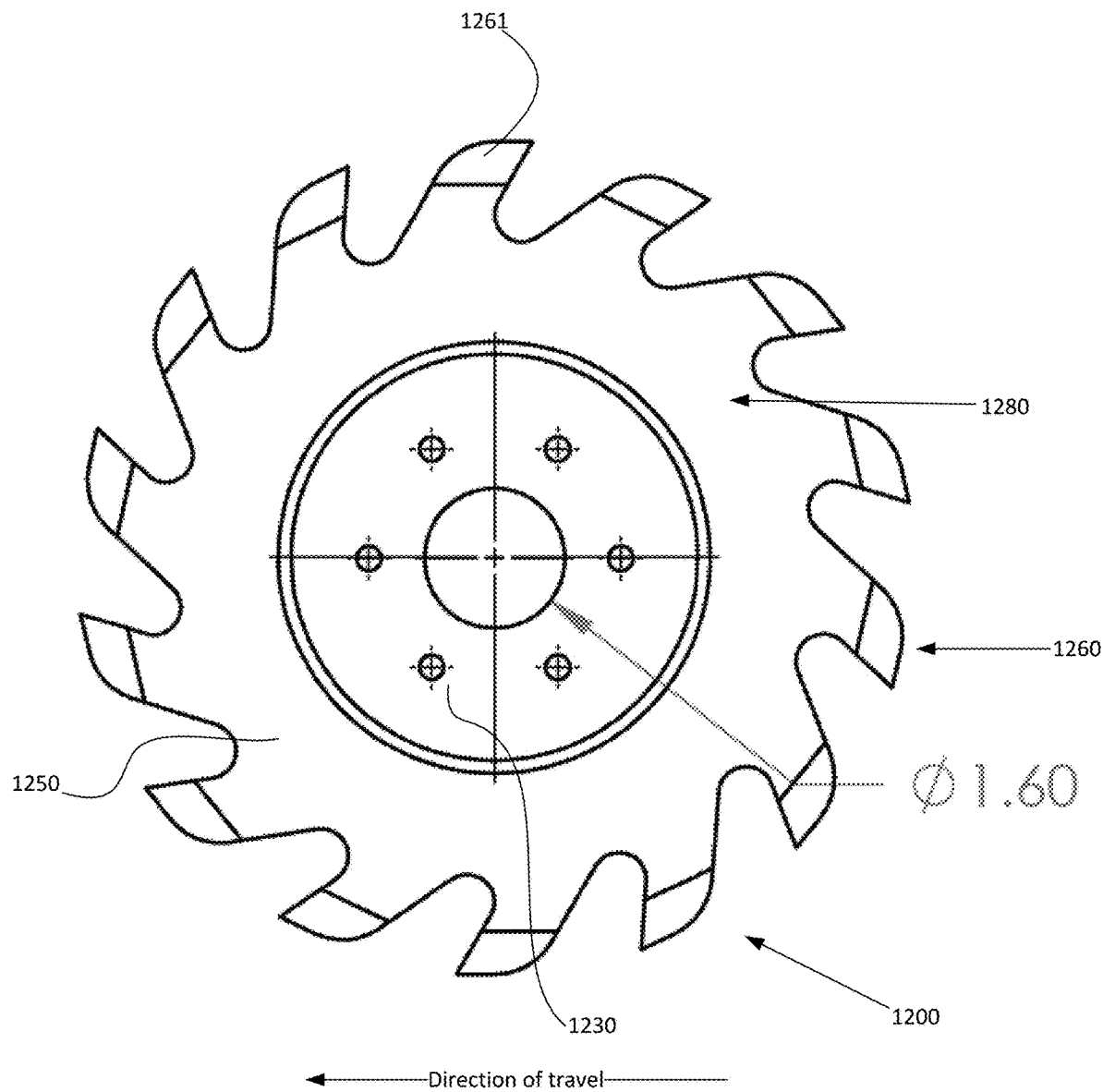
FIG. 15 provides a back side view of a left side row cleaning/closing wheel in accordance with the present invention.
Figure 16:
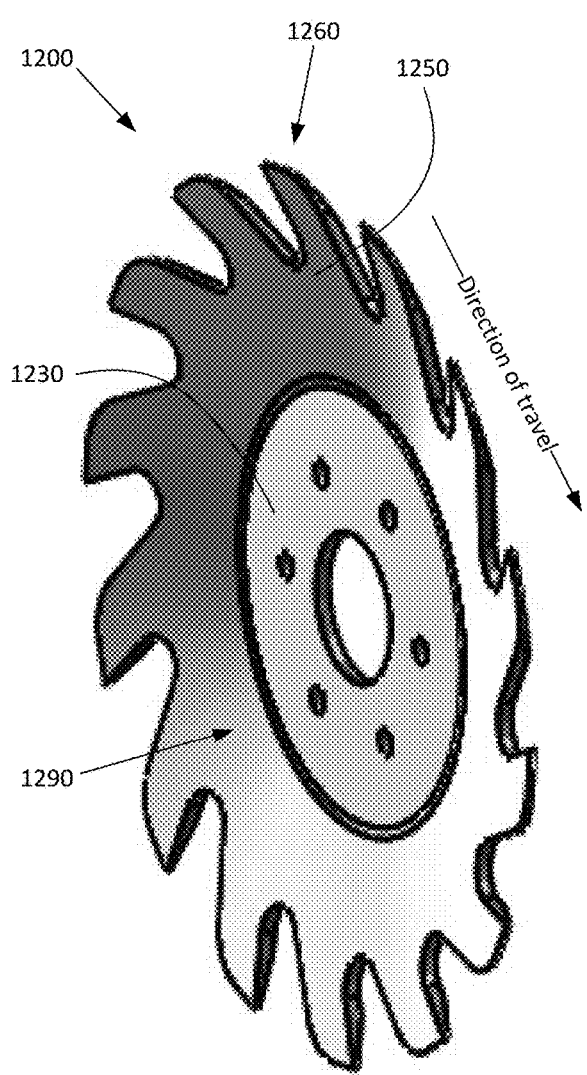
FIG. 16 provides a front perspective view of a left side row cleaning/closing wheel in accordance with the present invention.
Figure 17:
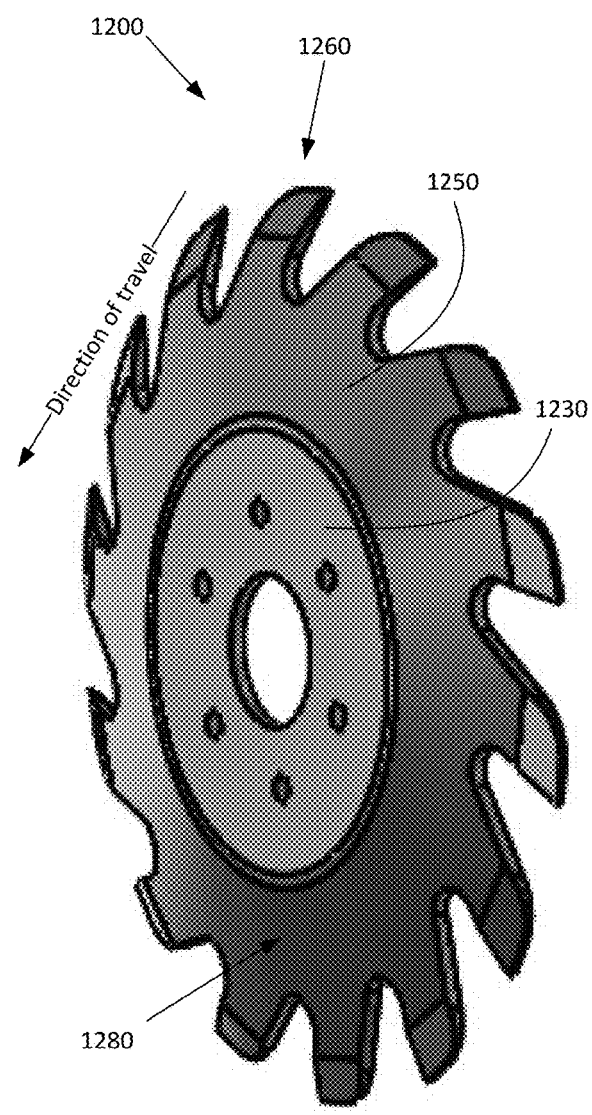
FIG. 17 provides a rear perspective view of a left side row cleaning/closing wheel in accordance with the present invention.
Figure 20:
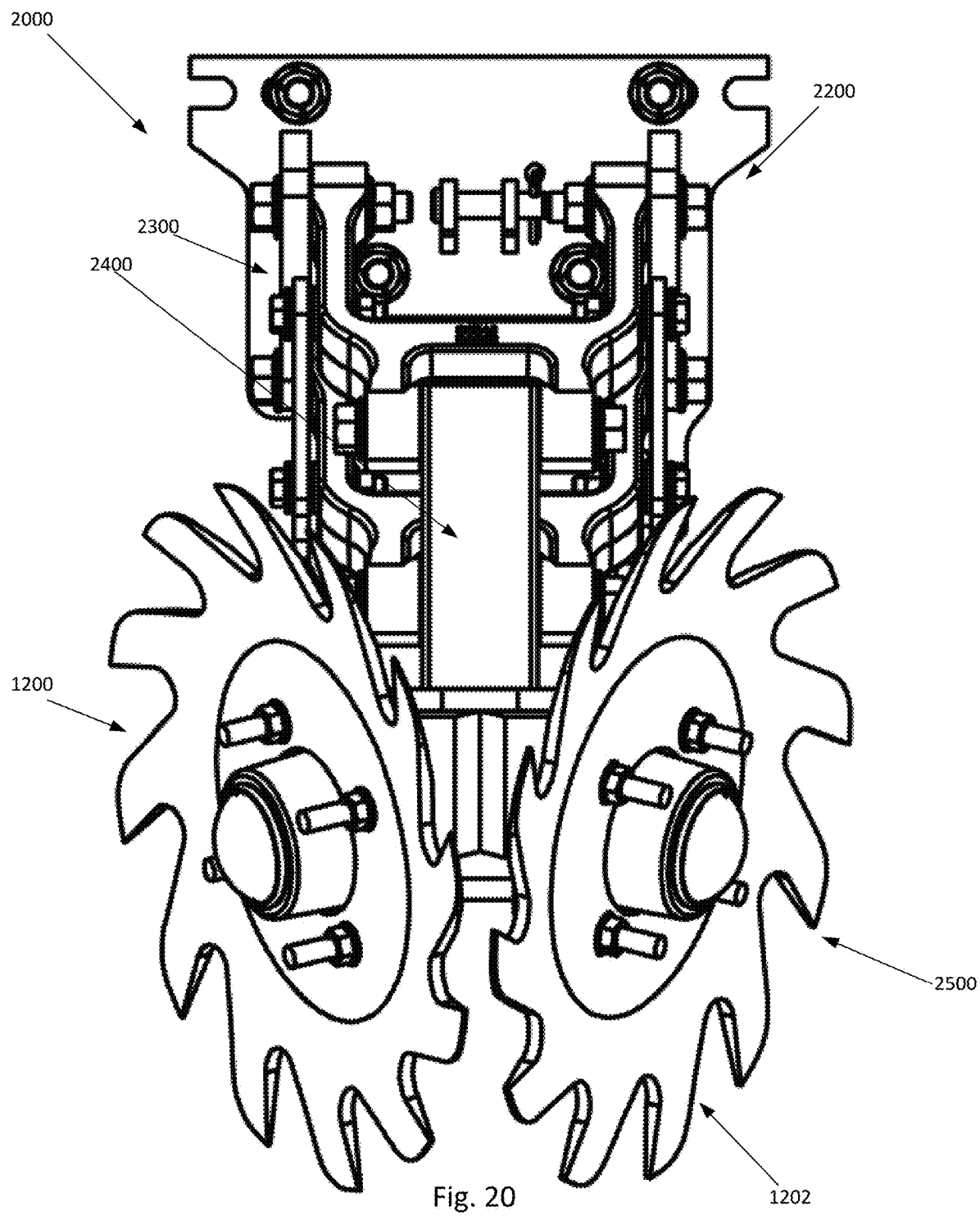
FIG. 20 provides a front view of a compact parallel arm row cleaner assembly including an improved row cleaner wheel according to an embodiment of the present invention.
Figure 21:
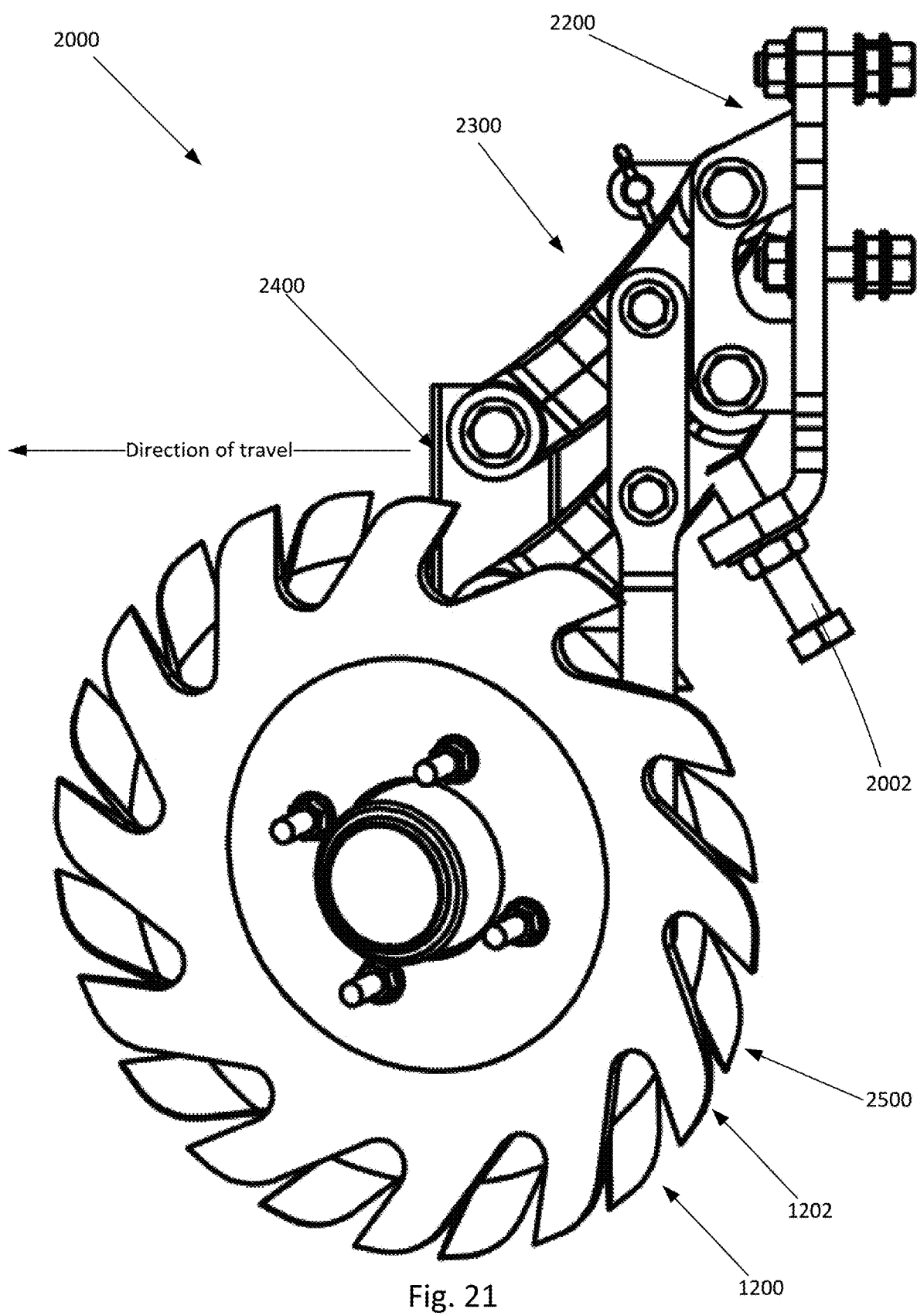
FIG. 21 provides a right side view of a compact parallel arm row cleaner assembly including an improved row cleaner wheel according to an embodiment of the present invention.
Figure 23:
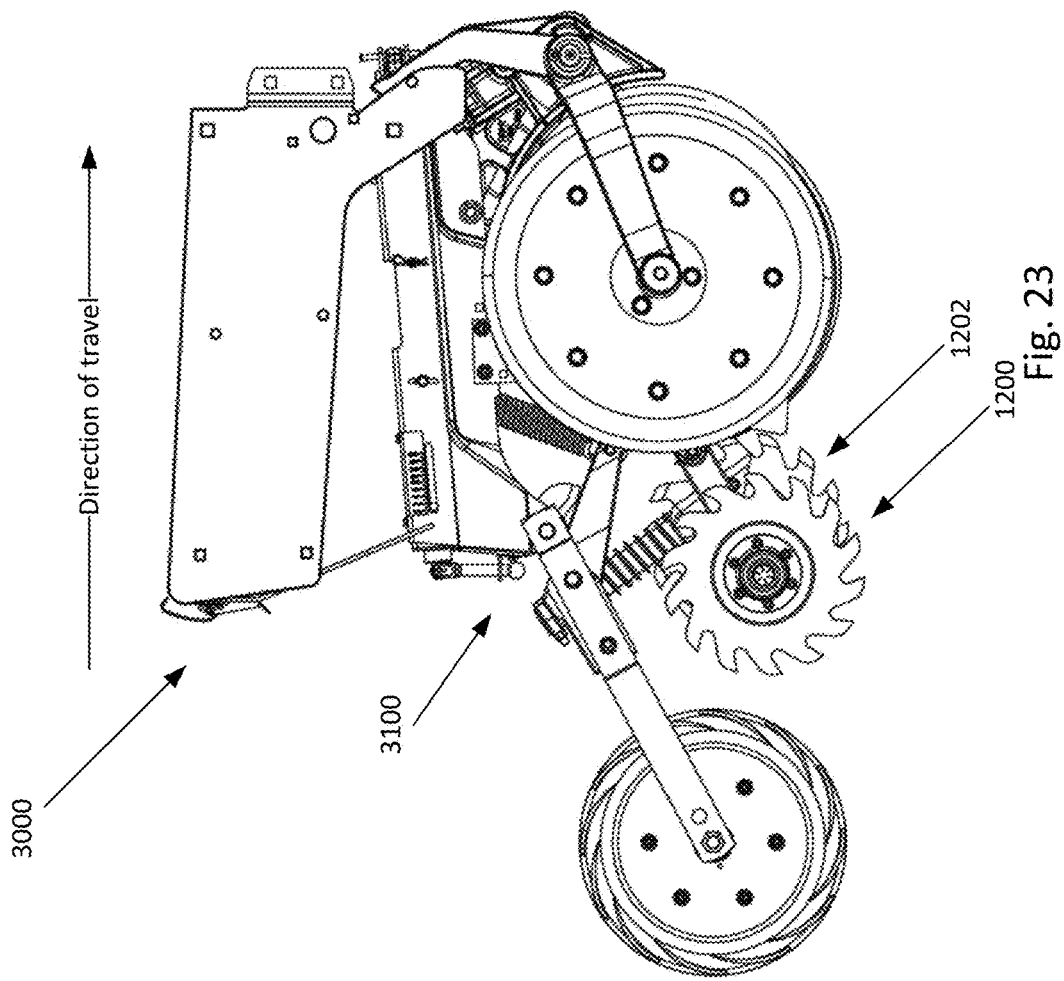
FIGS. 22 and 23 provide respective perspective and side views of an improved row cleaner wheel in a row closing configuration with a planter according to an embodiment of the present invention.
Figure 22:
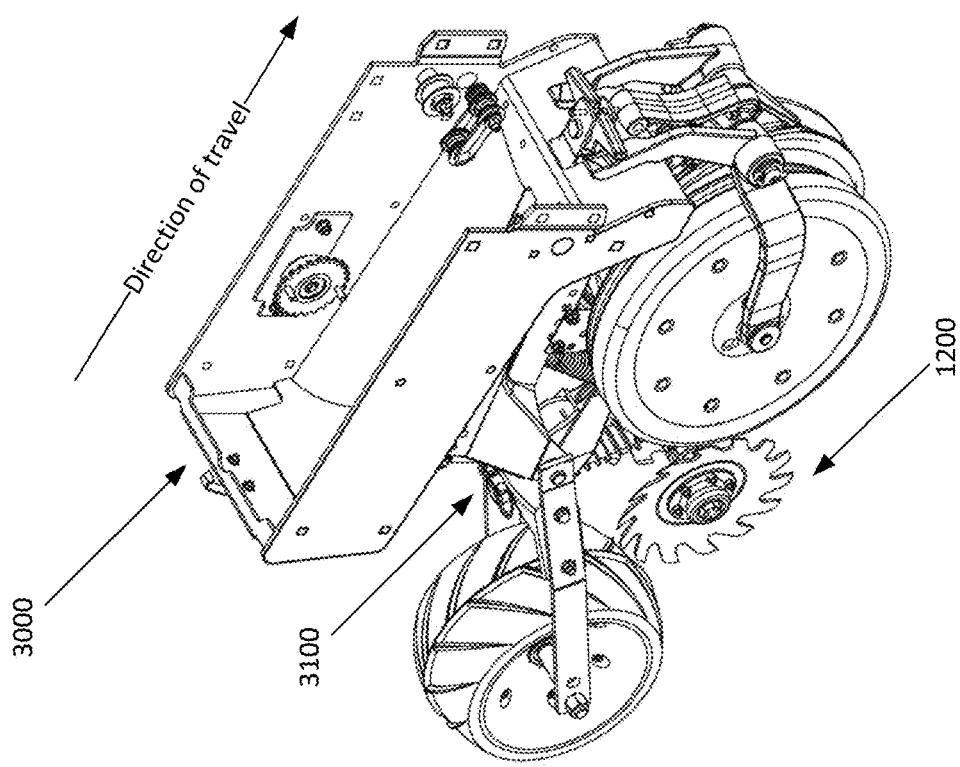
Figure 24:
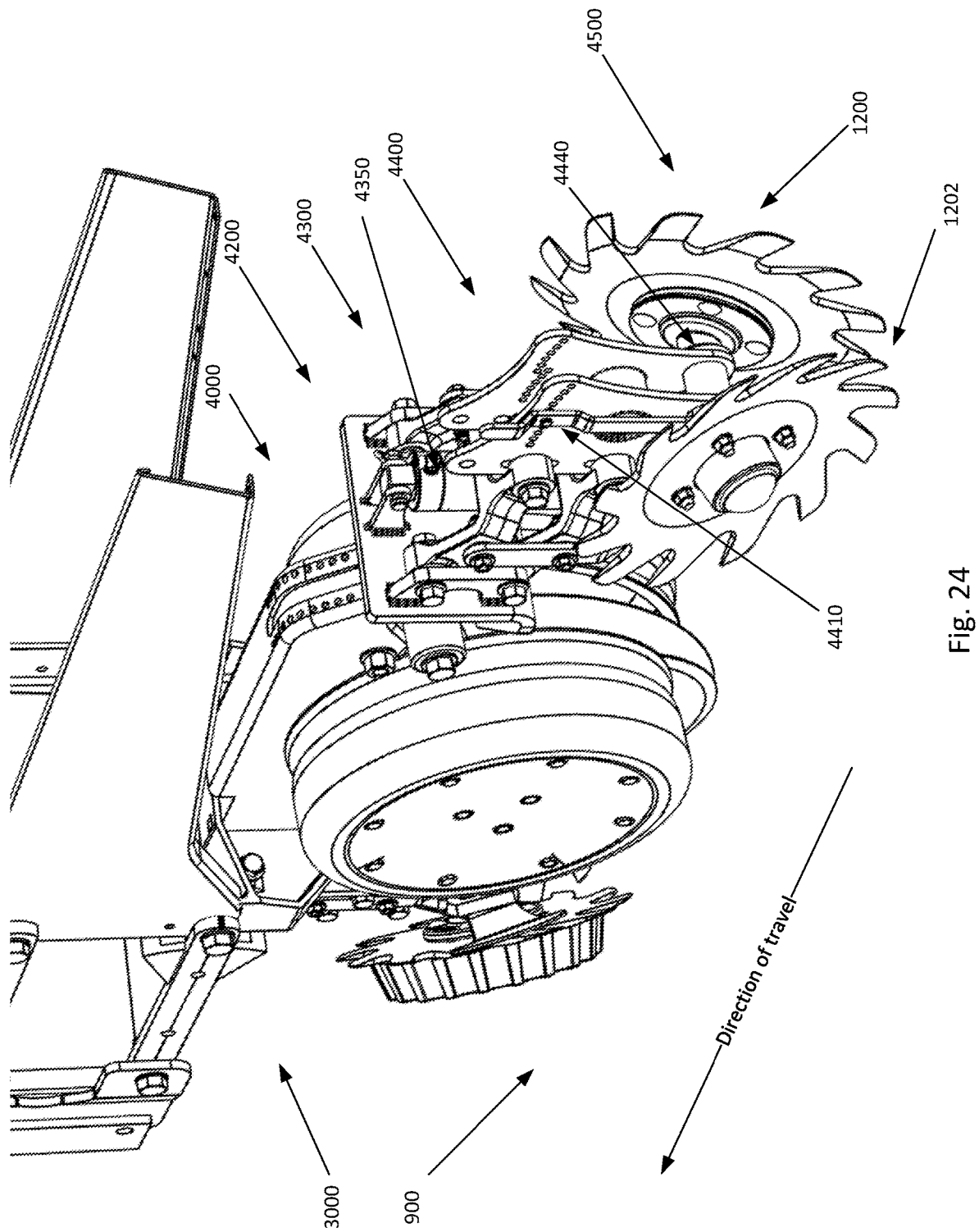
FIG. 24 provides a rear perspective view of an improved row cleaner wheel in a row closing configuration with a planter according to an embodiment of the present invention.
Figure 25:
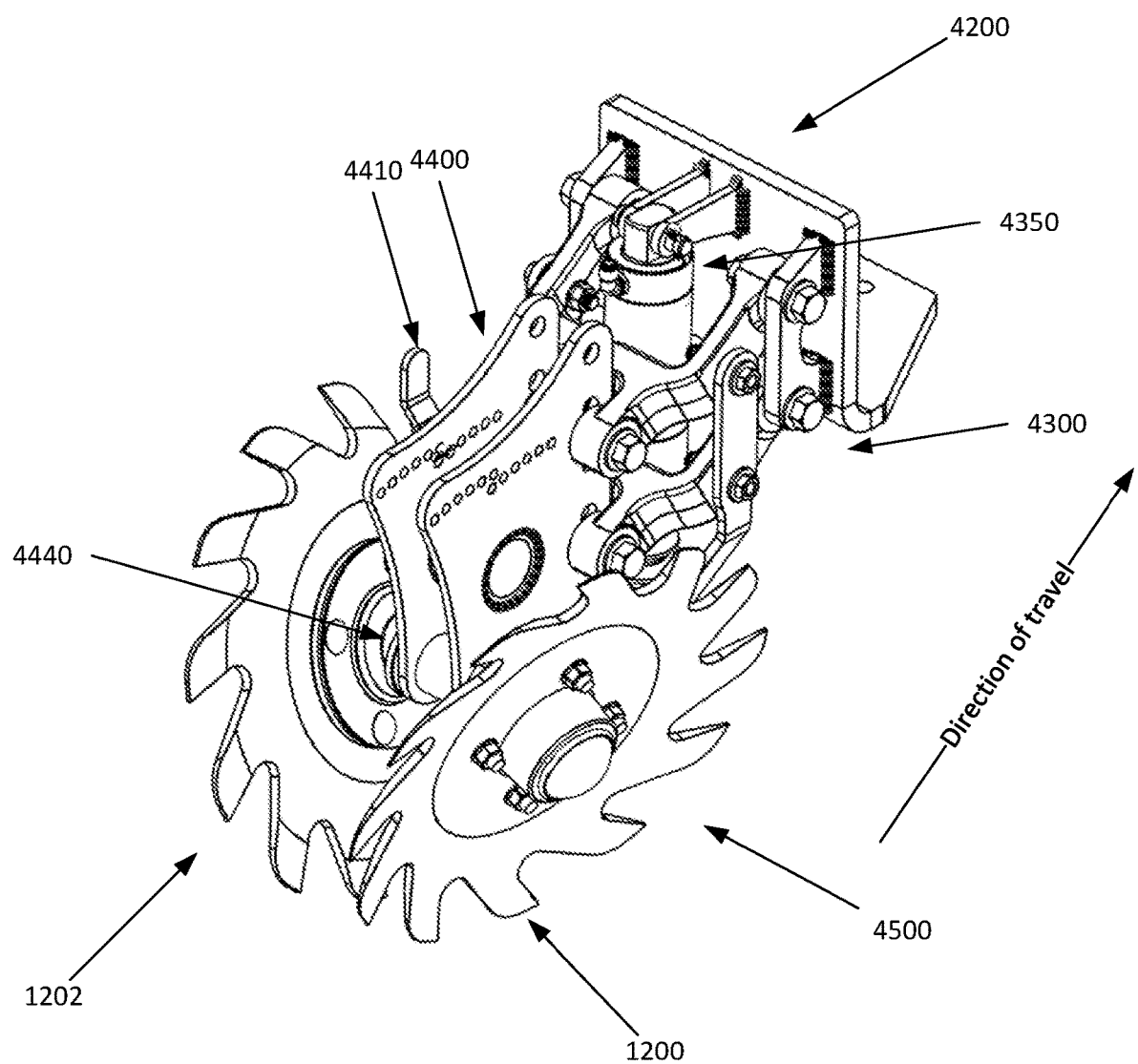
FIG. 25 provides a perspective view of an improved row closer wheel on a row closer frame according to an embodiment of the present invention.

FIGS. 2-8 are a first series of views comprising side, partial and perspective views that illustrate the features of a first "flat" embodiment of an inventive closing/cleaning wheel. FIGS. 9-11 illustrate the inventive wheel of the first "flat" embodiment in connection with a row cleaning section and configuration. FIGS. 12-17 are a second series of views comprising side, partial and perspective views that illustrate features of a second embodiment of an inventive closing/ cleaning wheel having a concave or convex (depending on perspective) body shape. The second "concave" embodiment is characterized in that is has a convex (or concave depending on perspective) body shape. FIGS. 18-21 illustrate the inventive wheel of the second "concave" embodiment in connection with a row cleaning section and configuration. FIGS. 22-23 illustrate the inventive wheel of the second "concave" embodiment in connection with a furrow closer or closing section and configuration. FIGS. 24-25 illustrate the inventive wheel of the second "concave" embodiment in connection with both a row cleaning section at the leading part of the planter row unit and a furrow closer or closing section at the trailing part of the planter row unit.

The improved closing/cleaning wheel invention is described herein for purposes of explaining exemplary uses of the invention in connection with: 1) row cleaning (also referred to as debris clearing) at the front or leading end of a planter row unit, and 2) closing operation with the inventive row cleaning/closing wheels 40/50 used at the back or trailing end of the planter row unit for closing a planted furrow. Both functions may be used on a given planter row unit as shown in FIGS. 24-25.

For row cleaning or clearing operation a pair of wheels may be intermeshed or aligned as desired based on given field surface conditions and the nature of debris encountered on the filed in advance of seed planting operation. One goal of the cleaning wheels is to remove debris from the immediate site of the intended furrow created in the seed planting operation, e.g., by operation of a coulter or v-shaped blade or the like. By removing debris the row cleaning component provides a cleaner condition for better furrow creation and improved and consistent seed placement. The coulter creates a furrow for receiving seed, fertilizer and other intended materials as explained elsewhere herein and as well-known in the art.

For closing operation post-seed planting, spading closing wheels move soil toward the seed at planting depth, while lifting and fracturing the surface layer to achieve compaction free closing of the seed trench in wet, hard, or sod conditions. With soil firmed around the seed from each side and the surface layer loosened, crops emerge sooner and planting can be done at the proper depth, even in wetter conditions, without fear of crushed soil above the seed preventing emergence. Spading closing wheels preferably do not attempt to close the seed trench by a crushing action from the top down. The soil is wedged toward the seed from either side at seeding depth by a pair of Martin Row Cleaner wheels 40/50. The ends of the teeth have full bevels cut on them. The beveled sides of the teeth on each wheel are placed toward the row and the narrow edge enters the soil first producing a wedging action. As the teeth on the wheels rotate up out of the soil, a slight lifting and crumbling occurs in the surface layer. The area on either side of the seed and immediately above it is not fractured. Because of the shape and spacing of the teeth on these wheels, wet soil does not bind to them as it does with other teeth shapes and spacings. Additionally, in row closing operations the number of teeth may be reduced to improve the efficiency of the closing action, or the depth of the teeth on the wheel in the closing configuration may be adjusted to prevent binding or improper row closing.

Figure 2:
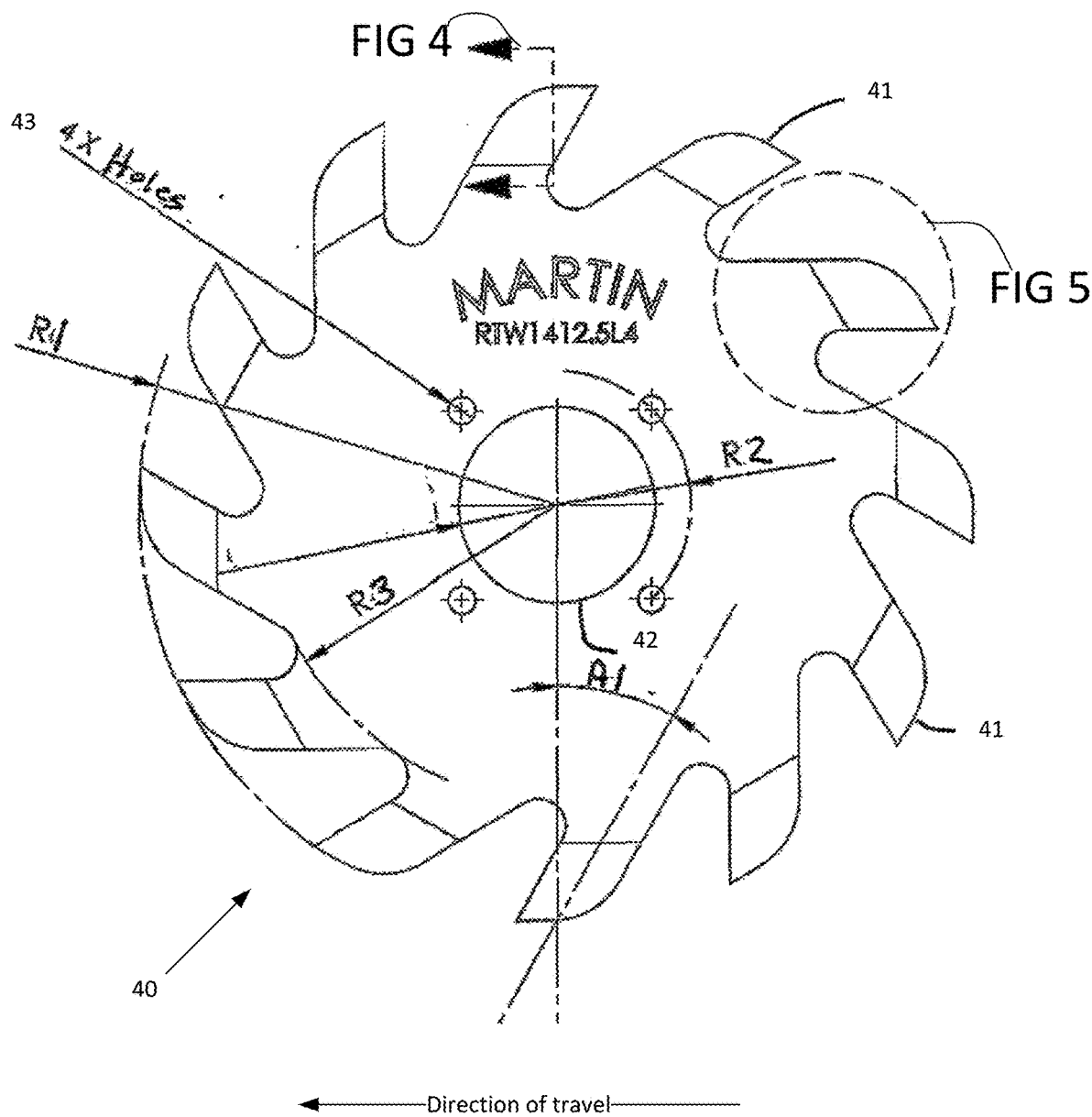
FIG. 2 provides a side view of a left-side row cleaning/closing wheel in accordance with the present invention.
Figure 3:
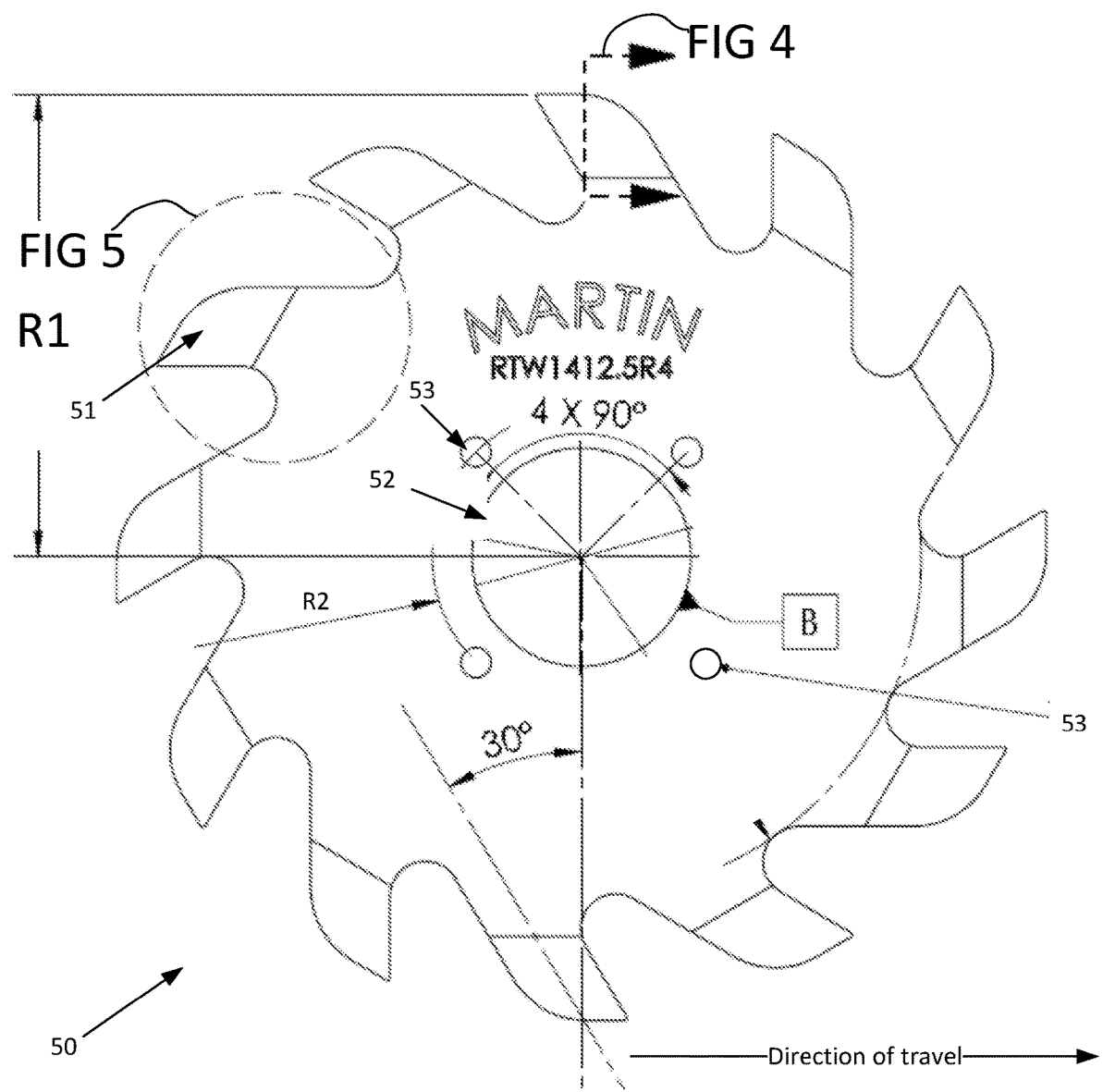
FIG. 3 provides a side view of a right-side row cleaning/closing wheel in accordance with the present invention.

Now with reference to FIGS. 2 and 3, the first "flat" embodiment of the inventive closing/clearing wheel is shown in detail in side perspective views. It should be understood the wheels are provided in complimentary configurations. The selection and placement of the wheels is dependent on the operation intended as the configuration of the teeth is designed to engage the ground and debris to provide an intended benefit. The selection of left or right-side wheel configurations in light of direction of travel and teeth profile is critical to achieve optimal performance in both closing and clearing operations.

FIGS. 2 and 3 are shown and described herein in the context of "Left-side" cleaning/closing wheel 40 includes a series of teeth 41 and "Right-side" cleaning/closing wheel 50 includes a series of teeth 51. As shown, during rotational path of the wheel, the teeth 41/51 exit and become perpendicular to the ground. The design intent is so any foreign material that may try to wrap or stick to the teeth will fall off. The problem with standard toothed wheels is that in some conditions they wrap due to the teeth being straight. like the standard wheel 38 of FIG. 1, which pulls residue apart rather than cutting it as in the case of the present invention wheel 40/50 and teeth 41/51. It has fully beveled teeth on one side but could be manufactured with a smaller amount of bevel on both sides. The present invention offers two distinct versions of wheel, left and right, and provides an improved performance over prior wheels, e.g., those that do not come in lefts and rights and are beveled on both sides.

FIGS. 4-6 illustrate the right-side version row cleaning/ closing wheel 50 (FIG. 3) and provide details of tooth configurations for teeth 51. In an opposite but similar fashion, the details of the tooth configurations shown in FIGS. 4-6 apply to the reverse orientation of teeth 41 of row cleaning/closing wheel 40 (FIG. 2).

Referring now to the exemplary drawings, and more particularly to FIGS. 2-8, there are shown two versions, left and right, of row cleaning/closing wheels 40 and 50, which may be used individually or in combination. For example, circular wheels 40/50 may be used as a coulter on a cultivator or as part of an agricultural planter row section. Left and right wheels 40/50, respectively, have a central hub 42/52 and a series or set of multiple teeth or tines 41/51 extending from the central body and radiating outwardly along the 360-degree periphery. In this example the set of teeth comprises 12 teeth equally separated 30 degrees (360 degrees divided by 12=30 degrees) about the periphery. The central body, in the present example but not by way of limitation, has four mounting holes to secure wheel 40/50 to a rotating hub of a row cleaner assembly, for example. Wheel 40/50 preferably has a radius R1 of a preferred dimension, which can be 4-11 inches, or more specifically 6-7 inches, or approximately 6 inches or 6.25 inches. A radius R2 defines a distance from the center of wheel 40/50 to the location of the four mounting holes. A radius R3 defines an inner radius that subscribes a circle on the body of wheel 40/50 and is tangent to an inside radius of the voids between teeth or tines 41/51. Radius R3 can be approximately 2 inches less than radius R1, i.e., a radius of 4-5 inches or approximately 4.4 inches. The teeth 41/51 have a central longitudinal line that is angled at angle A1 from a ray emanating from the center point of the respective wheel 40/50. Angle A1 can be approximately 30 degrees or between 28 and 32 degrees, or approximately 29.5 degrees.

Referring to FIG. 4, teeth 51 have a cross-sectional profile with surfaces 60 and 61 being angled relative to each other by an angle A2, which can be approximately 10 degrees. Note that surface 61 is substantially perpendicular to a rotational axis of wheel 50, as such surface 60 is beveled. As such each of the teeth 51 have a similar bevel on one side of wheel 50 of the present invention, left-side wheel 40 has teeth 41 with bevels on the opposite side so that in their application the two wheels/teeth configurations provide mirror image wheels or blades that may be used in tandem or to complement each other. The bevel is defined by the dimension denoted as D1 as surface 60 proceeds toward the center of wheel 50 to dimension D2 over a length of dimension D3, where D1 can be 0.05 inch; D2 approximately 0.25 inch and D3 greater than an inch.

Now viewing the elements of each tooth 51 as illustrated in the B-view of FIG. 5, sides 63 and 64 of tooth 51 are parallel or substantially parallel having dimensions D4 and D7 respectively accorded to them, with dimension D4 being approximately 1.7 inches and dimension D7 being approximately 1.3 inches. Tooth 51 has a distance D5 between sides 63 and 64, which is approximately 1 inch. From a point 66 of tooth 51 there is a straight section 65 having a dimension D6 of approximately 0.5 inch extending at an angle A3 of approximately 60°, with a radius R5 of approximately 1.2 inches extending from section 65 to side 63. It is contemplated that angle A3 maybe set from approximately 45° to approximately 75°. A radius R4 of approximately 0.4 inch extends from side 64 to a side 63 of an adjacent tooth.

It is contemplated that wheel 40/50 will often be sized at 11-14 inches, with other sizes, such as 8 or 9 inches, which would work well on Case-IH early riser planters to close the seed trench in place of a straight tooth wheel of 9 inches or the OEM 8-inch smooth closing disc. Wheel 40/50 could also be used in larger sizes to open a trench for fertilizer to be placed in, for example, a UMO-100 single disc fertilizer opener, replacing the smooth disc with a 15-inch row cleaning/closing wheel 40/50 which should turn easier and require less down force to penetrate the soil.

Wheel 40 also works well to close seed trench on, for example, Mex Emerge style planters in place of the factory rubber closing wheels, in a manner similarly to spading closing wheels, also provided by the Applicant. It is further contemplated that liquid fertilizer can be placed beside a wheel 10 as it closes the seed trench in another improved version.

With reference to FIG. 5, note that sides 63 and 64 are parallel and that teeth 51 are rotated at angle A1 of 29.5 degrees from vertical. Accordingly, in this configuration wheel 50 also has a 60.5-degree angle A3 on the crown compared to teeth of the prior art, e.g., prior art teeth that have a radius equaling half the diameter. Applicant's wheel 50 also has wider teeth and an angle A2 of the bevel down to 10° so it will cut material rather than pull it apart like other wheels do. The present invention has, as previously mentioned, left and right-hand bevels, as compared to the prior art that has small amount of bevel on both sides of each tooth.

Figures 7, 8:
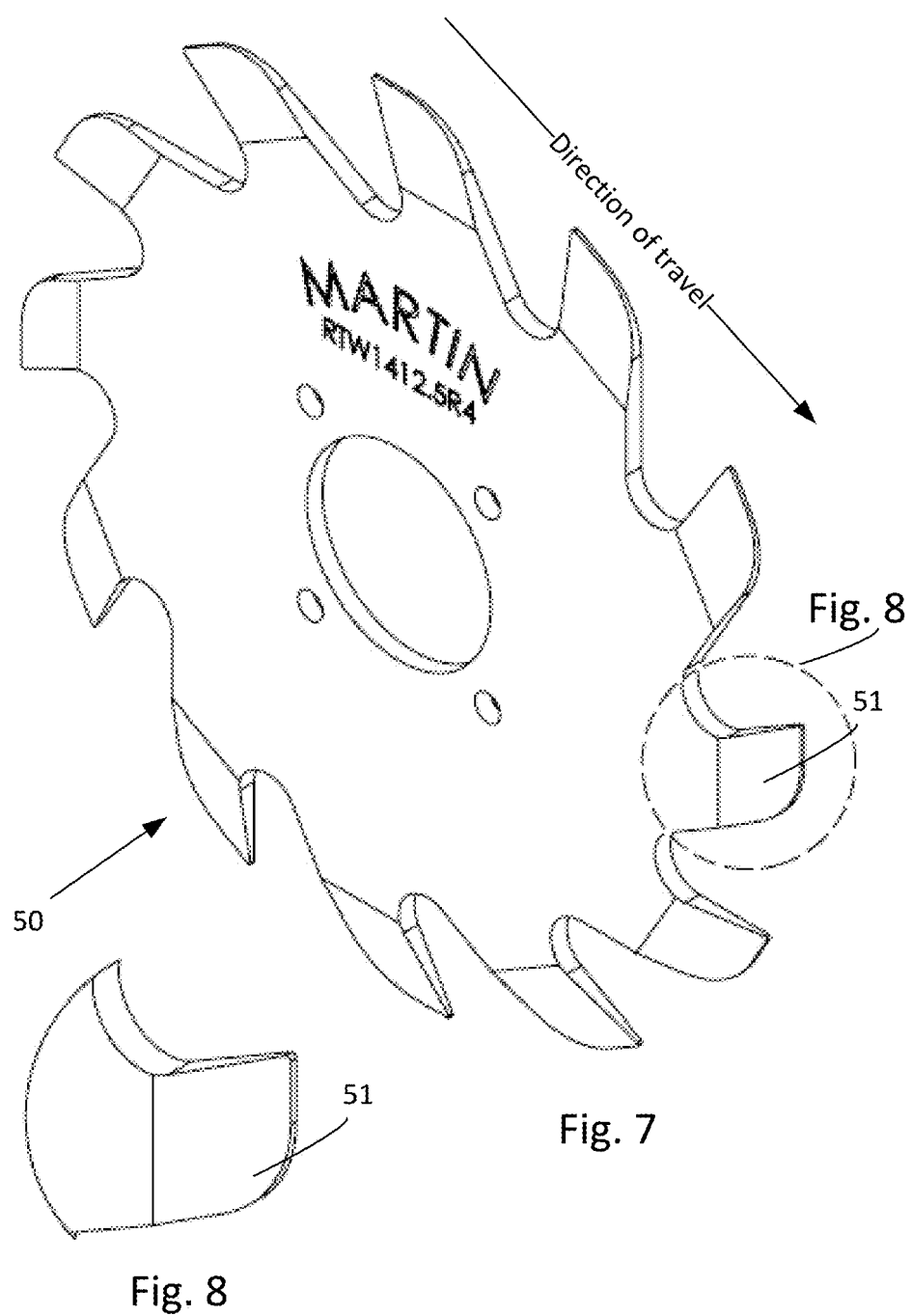
FIG. 7 provides a perspective view of the right-side row cleaning/closing wheel of FIG. 3.
FIG. 8 provides a perspective view of the tooth configuration of the right-side row cleaning/closing wheel of FIG. 5.

FIG. 6 illustrates a side-view of the row cleaning/closing wheel 50. FIGS. 7 and 8, respectively, are perspective views of the right-side row cleaning/closing wheel or disc 50 (or portion thereof) illustrated in FIGS. 3 and 5.

With reference now to FIGS. 9-11, various views and illustrations of an embodiment of a compact parallel arm row cleaner 100 incorporating the improved row cleaning/closing wheels 40 and 50 as a row cleaning wheel in accordance with an embodiment of the present invention are provided. As shown in FIG. 9, the compact parallel arm floating row cleaner 100 comprises a frame mounting plate 200, a parallel arm floating assembly 300, a stem assembly 400, and wheel assemblies 500 including left row cleaning wheel 40 and right row cleaning wheel 50. Row cleaning wheels 40 and 50 are configured to intermesh or intertwine or intersect in a complimentary manner to provide improved row cleaning and debris removal operation of the row cleaner during row planter operation. As described herein, the left and right row cleaning wheels include similar attributes, e.g., diameter, thickness, number of teeth, tooth configuration, but are configured for cooperative, rotational interoperation when spaced apart, oppositely faced, and angled toward one another so as to account for spatial, angular and rotational operational requirements. Specifically, in row closing operations the number of teeth may be reduced to improve the efficiency of the closing action, or the depth of the teeth on the wheel in the closing configuration may be adjusted to prevent binding or improper row closing. Row cleaning wheel dimensions preferably take into account the nature of oppositely faced rotational operations when installed on a row cleaner apparatus. The compact parallel arm floating row cleaner 100 uses the improved performance of the improved row cleaning wheels 40 and 50 to provide benefits of a fixed row cleaner assembly 10 while also providing benefits of a "horizontal" floating row cleaner.

In some of these row cleaner systems, the wheels are pushed against the ground by their weight, and the frame of the row cleaner must be long to keep the angle of the frame at the right angle of attack. In other designs a pneumatic air cylinder may be attached to the floating row cleaner to increase or decrease the pushing force of the wheels to the ground and to make the wheels more or less aggressive in digging the ground. However, these designs may still change the relative angle of the cleaning wheel assemblies to the ground as they move over terrain having different elevations or height changes. Some existing floating row cleaner designs are long, and the wheels in such designs run far ahead from the planter (i.e., they extend outwards a relatively large distance from the mount attached to the planter). One further design consideration related to angular displacement, since the frame swings around the pin point at the frame mount, the angle between the wheels and the ground changes when the frame swings.

The compact parallel arm floating row cleaner 100 is relatively as compact as pin adjust or fixed row cleaner assemblies, but can move the wheels 500 vertically, both up and down, without changing the angle between the wheels 500 and the ground. The four arms of the parallel arm floating assembly 300 keep the stem assembly 400 vertical and parallel to the frame mounting plate 200. In the embodiment provided in FIG. 9, the parallel arm floating assembly 300 is secured by a fastener to the frame mounting plate 200 and may move rotationally about the fastener by a bushing or bearing.

With reference now to FIG. 10, a top view of a compact parallel arm row cleaner 100 is provided with left and right row cleaning wheels 40 and 50. In this view, the orientation of the parallel arm floating assembly 300 with respect to the frame mounting plate 200 and the stem assembly 400 can be seen. The stem assembly 400 is positioned out a short distance from the frame mounting plate 200 by the parallel arm floating assembly 300 and is permitted to move up and down vertically with respect to the ground by the parallel arm floating assembly 300 while maintaining a generally parallel orientation with respect to the frame mounting plate

200. The relative angle of elements of the parallel arm floating assembly 300 change with respect to the frame mounting plate 200 and stem assembly 400, but the stem assembly 400 and frame mounting plate 200 maintain a substantially parallel relative orientation. FIG. 11 provides a rear view of the compact parallel arm row cleaner 100 including the frame mounting plate 200, the parallel arm floating assembly 300, the stem assembly 400, and the wheel assemblies 500 with left and right row cleaning wheels 40 and 50.

With reference now to FIGS. 12-17, various views and illustrations of an embodiment of a left side row cleaning/closing wheel 1200 are provided. The row cleaning/closing wheel 1200 is adapted to be installed on the left side of a row cleaning or row closing frame, as shown in FIGS. 18-23, and may be installed with a corresponding right side row cleaning/closing wheel 1202 being similarly configured to the row cleaning/closing wheel 1200. Referring back to FIGS. 12-17, the row cleaning/closing wheel 1200 comprises a center 1210, a front 1290, a back 1280, an inner circumference 1240, and an outer circumference 1242. The inner circumference 1240 defines the outer edge of the center hub base 1230, which is a minor diameter of the row cleaning/closing wheel 1200 on a first plane 1232. The center hub base 1230 has a circular center hub opening 1272 concentric to the inner circumference 1240 adapted to receive a hub or a portion of a row closer/cleaner mount frame. A set of passthrough openings 1270 provide for fasteners, such as a set of bolts, to pass through the row cleaning/closing wheel 1200 such that the row cleaning/closing wheel 1200 may be secured by a set of nuts, retaining pins, retaining clips, or other suitable fastening and securing means.

The row cleaning/closing wheel 1200 further comprises a sloped body portion 1250 defined as a portion of a major diameter of the row cleaning/closing wheel 1200 between the inner circumference 1240 and the outer circumference 1242. The sloped body portion 1250 is angled relative to the first plane 1232 from the inner circumference 1240 to the outer circumference 1242. The outer circumference 1242 is offset at a second plane 1252 from the first plane 1232 relative to the front 1290 of the center hub base 1230 of the row cleaning/closing wheel 1200. The angle of the slope of the sloped body portion 1250 may be between 10 and 20 degrees relative to the first plane and the center hub base 1230 and in a preferred embodiment is between 13 and 15 degrees and can be seen in the cross-section along line A-A shown in FIG. 13. The offset of the outer circumference 1242 from the inner circumference 1240 may be 0.54 inches. The height or distance of the offset from the first plane 1232 to the second plane 1252 may also be defined by a circle with a radius of 0.5 inches. The major diameter of the outer circumference 1242 may be 9.54 inches and the minor diameter of the inner circumference 1240 may be 4.75 inches.

The configuration of the set of teeth 1260 at the outer circumference 1242 of the row cleaning/closing wheel 1200 is similar to that of the row cleaning/closing wheels 40 and 50 shown in FIGS. 2-5 and described hereinabove. The set of teeth 1260 may each have a chamfered edge or blade 1261 which may be 0.5 inches long and chamfered at an angle of 12 degrees.

In an alternate embodiment, the shape of the sloped body portion 1250 and the center hub base 1230 may form a gradual and continuous curve from the center 1210 to the outer circumference 1242 and up from the first plane 1232 to the second plane 1252. The gradual and continuous curve of the row cleaning/closing wheel 1200 formed by the sloped body portion 1250 and center hub base 1230 may be defined by the minor arc of a circle.

The cupped or sloped shape, which may be convex or concave depending on the orientation of the row cleaning/closing wheel 1200 when installed on a frame, of the row cleaning/closing wheel 1200 provides for improved closing and cleaning action when used with a planter. For example, the shape of the sloped body portion 1250 of the row cleaning/closing wheel 1200 provides for the improved closing or cleaning of a planting row with less soil resistance and binding in certain soil types. The shape of the row cleaning/closing wheel 1200 also provides for the improved visibility and management of the closing and cleaning density of a planting row.

Figure 18:
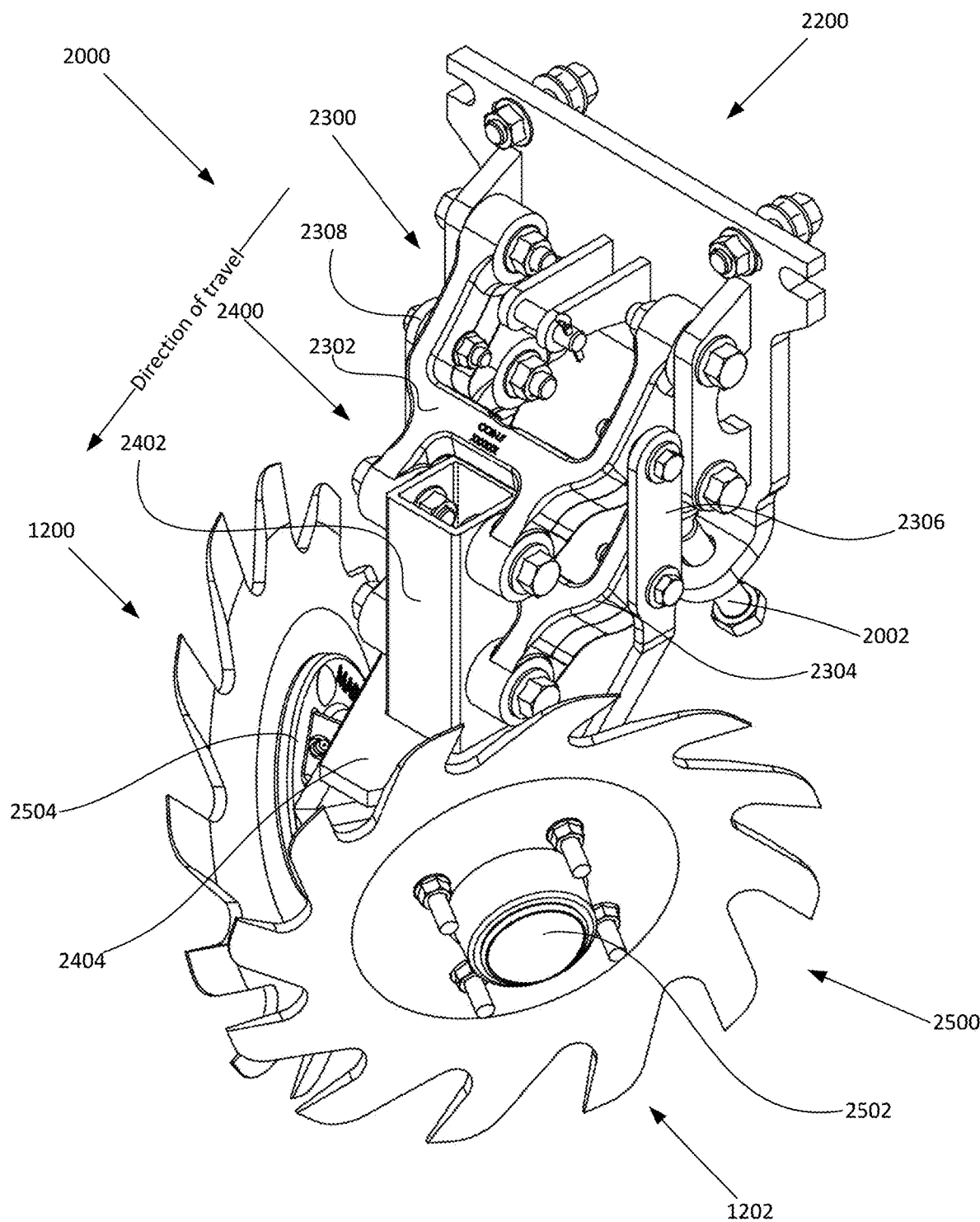
FIG. 18 provides a perspective view of a compact parallel arm row cleaner assembly including an improved row cleaner wheel according to an embodiment of the present invention.

With reference now to FIGS. 18-21, various views and illustrations of an embodiment of a compact parallel arm row cleaner 2000 incorporating the improved row cleaning/closing wheels 1200 and 1202 as a row cleaning wheel in accordance with an embodiment of the present invention are provided. As shown in FIG. 18, the compact parallel arm floating row cleaner 2000 comprises a frame mounting plate 2200, a parallel arm floating assembly 2300, a stem assembly 2400, and wheel assemblies 2500 including left row cleaning wheel 1200 and right row cleaning wheel 1202. The parallel arm floating assembly 2300 comprises upper arm 2302, lower arm 2304, left support arm 2306, and right support arm 2308. The stem assembly 2400 comprises a stem 2402 and a lower portion 2404 for mounting one or more row cleaning or closing wheels, such as wheels 1200 and 1202. Row cleaning wheels 1200 and 1202 are disposed on and secured to respective hubs 2502 and 2504 such that the row cleaning wheels 1200 and 1202 may freely rotate on the hubs. Row cleaning wheels 1200 and 1202 are configured such that the slope of the sloped body portion of each wheel is oriented away from the lower portion 2404 of the row cleaner during row planter operation to provide for improved cleaning of the planted row. If installed in a row closing configuration the slope of the sloped body portion of each wheel 1200 and 1202 provides for improved row closing action and consistency while providing improved visibility of the row closing action. As described herein, the left and right row cleaning wheels 1200 and 1202 include similar attributes, e.g., diameter, thickness, number of teeth, tooth configuration, but are configured for cooperative, rotational operation when spaced apart, oppositely faced, and angled toward one another so as to account for spatial, angular and rotational operational requirements. Row cleaning wheel dimensions preferably take into account the nature of oppositely faced rotational operations when installed on a row cleaner apparatus. The compact parallel arm floating row cleaner 2000 uses the improved performance of the improved row cleaning wheels 1200 and 1202 to provide benefits of a fixed row cleaner assembly 10 while also providing benefits of a "horizontal" floating row cleaner.

The compact parallel arm floating row cleaner 2000 is relatively as compact as pin adjust or fixed row cleaner assemblies, but can move the wheels 2500 vertically, both up and down, without changing the angle between the wheels 2500 and the ground. The upper arm 2302 and the lower arm 2304 of the parallel arm floating assembly 2300 keep the stem assembly 2400 vertical and parallel to the frame mounting plate 2200. In the embodiment provided in FIG. 18, the parallel arm floating assembly 2300 is secured by at least one fastener to the frame mounting plate 2200 and may move rotationally about the fastener by a bushing or bearing.

Additionally, a bolt 2002 may be used as a depth adjustment or a depth stop for the angle or depth of the parallel arm floating assembly 2300.

Figure 19:
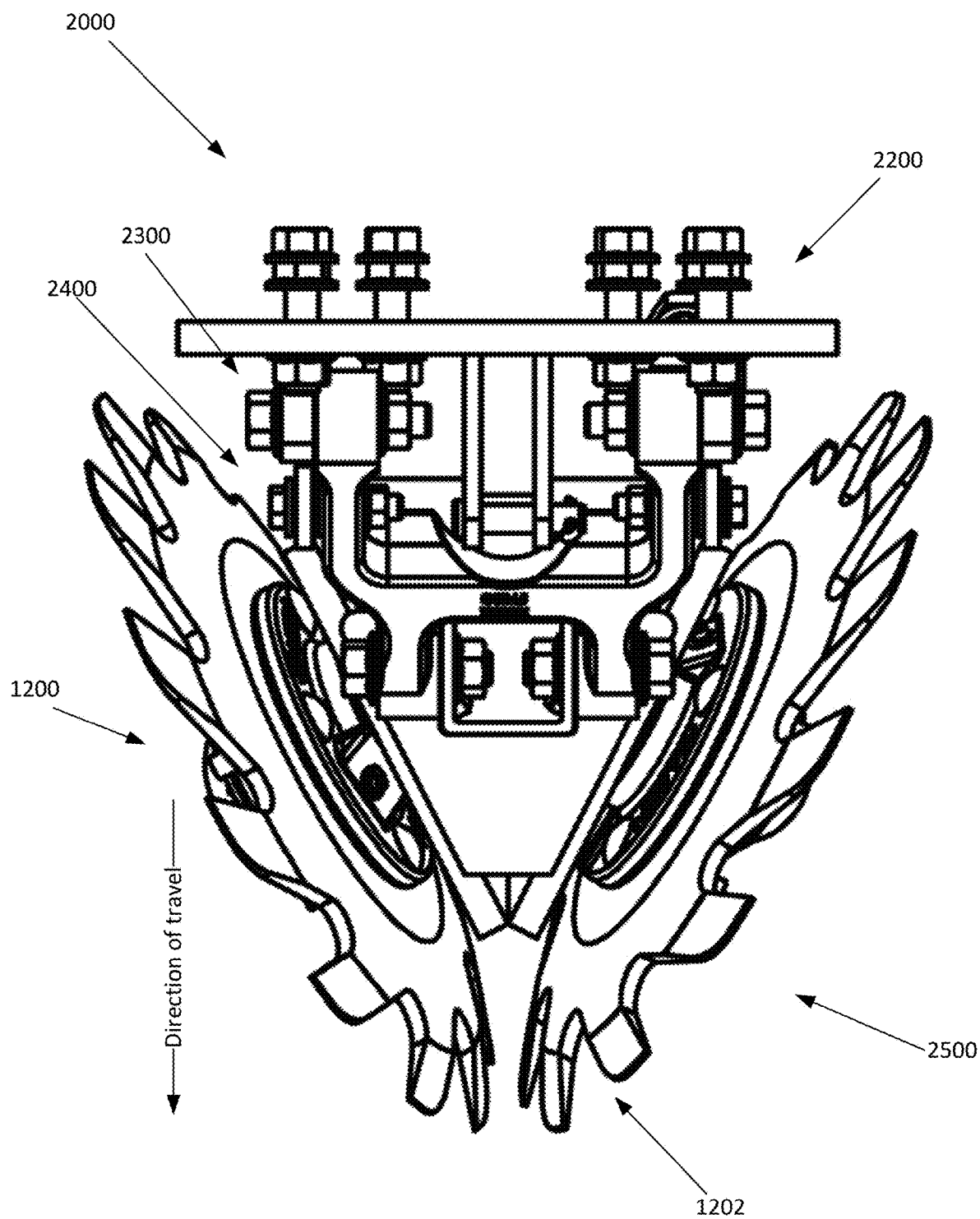
FIG. 19 provides a top view of a compact parallel arm row cleaner assembly including an improved row cleaner wheel according to an embodiment of the present invention.

With reference now to FIG. 19, a top view of a compact parallel arm row cleaner 2000 is provided with left and right row cleaning wheels 1200 and 1202. In this view, the orientation of the parallel arm floating assembly 2300 with respect to the frame mounting plate 2200 and the stem assembly 2400 can be seen. The stem assembly 2400 is positioned out a short distance from the frame mounting plate 2200 by the parallel arm floating assembly 2300 and is permitted to move up and down vertically with respect to the ground by the parallel arm floating assembly 2300 while maintaining a generally parallel orientation with respect to the frame mounting plate 2200. The relative angle of elements of the parallel arm floating assembly 2300 change with respect to the frame mounting plate 2200 and stem assembly 2400, but the stem assembly 2400 and frame mounting plate 2200 maintain a substantially parallel relative orientation. FIG. 20 provides a front view of the compact parallel arm row cleaner 2000 including the frame mounting plate 2200, the parallel arm floating assembly 2300, the stem assembly 2400, and the wheel assemblies 2500 with left and right row cleaning wheels 1200 and 1202. FIG. 21 provides a left side view of the compact parallel arm row cleaner 2000 including the frame mounting plate 2200, the parallel arm floating assembly 2300, the stem assembly 2400, and the wheel assemblies 2500 with left and right row cleaning wheels 1200 and 1202, and further shows the depth stop bolt 2002.

FIGS. 22 and 23 provide respective perspective and side views of an improved row closer wheels 1200 and 1202 in a row closing configuration installed on a row closer frame 3100 with a planter assembly 3000 according to an embodiment of the present invention. In this configuration, row closer wheels 1200 and 1202 may be installed on the same axial plane or may be installed in an offset manner to provide for improved closing action at certain planting depths. The sloped body portions of each wheel 1200 and 1202 act to press the soil of the open seed trench together to provide for the improved closing of the seed trench. Different offsets and depths of the wheels 1200 and 1202 provide for improved seed trench closing for different soil types and conditions and for different seed trench depths.

With reference now to FIGS. 24 and 25, perspective views of improved row closer wheels 1200 and 1202 installed on a row closer frame 4000 as part of a planter assembly 3000 are provided. The row closer frame assembly 4000 comprises a frame mounting plate 4200, a parallel arm assembly 4300 with a height adjustment cylinder 4350, and a stem assembly 4400. The height adjustment cylinder 4350 may be a pneumatic or hydraulic cylinder or may be an actuator, worm drive, or other suitable mechanism for adjusting the height and angle of the parallel arm assembly 4300. The frame mounting plate 4200 is adapted to secure the row closer frame assembly 4000 to the planter assembly 3000. The stem assembly 4400 comprises left and right plates secured to the front of the parallel arm assembly and further comprises a single axle 4440. The axle 4440 may be angled at each end to provide for the angled mounting of the hubs of the wheel assemblies 4500. The single adjustment arm 4410 may be used to adjust the amount of toe-in or the relative angle of each wheel 1200 and 1202 to each other. A row cleaning assembly 900, as shown in FIG. 9, may also be used with the planter assembly 3000 to clean the row before the furrow with the seed trough is dug by the planter assembly 3000 and subsequently closed by the closing assembly 4000.

It should be noted that the present invention is not limited to the specific embodiments pictured and described herein but is intended to apply to all similar methods for ground surface penetration during operation of planter, seeder or drill unit. Accordingly, modifications and alterations from the described embodiments will occur to those skilled in the art without departure from the spirit and scope of the present invention, the scope of which is only limited by the appended claims that follow.

What is claimed is:

1. A row closer wheel assembly for mounting to a row closer assembly of a row planter, the row closer wheel assembly comprising:
   a row closer wheel mount assembly having a first portion adapted to be mounted to a row closer assembly and a second portion adapted for mounting one or more row closer wheels;
   a first row closing wheel being substantially circular with a center, a front, a back, an inner circumference, and an outer circumference and comprising:
   a center hub base being a minor diameter on a first plane and defined by the inner circumference, the center hub base having a circular center hub opening at the center for mounting the first row closing wheel to the row closer wheel mount assembly;
   a sloped body portion being a portion of a major diameter of the first row closing wheel between the inner circumference and the outer circumference, the outer circumference being at a second plane offset from the inner circumference and the first plane relative to the front of the first row closing wheel, the sloped body portion being at a slope angle relative to the first plane; and
   a first set of teeth arranged about the outer circumference of the first row closing wheel;
   wherein the center hub base and the sloped body portion form a gradual and continuous curve from the first plane to the second plane.

2. The row closer wheel assembly of claim 1, wherein the slope angle is 13 degrees.

3. The row closer wheel assembly of claim 1, wherein the slope angle is 15 degrees.

4. The row closer wheel assembly of claim 1, wherein the offset of the outer circumference relative from the inner circumference relative to the first plane is 0.54 inches.

5. The row closer wheel assembly of claim 1, wherein the major diameter is 9.54 inches.

6. The row closer wheel assembly of claim 1, wherein the minor diameter is 4.75 inches.

7. The row closer wheel assembly of claim 1, wherein the gradual and continuous curve from the first plane to the second plane is defined by a minor arc of a circle.

8. The row closer wheel assembly of claim 1, wherein the row closer assembly further comprises a second row closing wheel.

9. The row closer wheel assembly of claim 1, wherein each of the first set of teeth include a tooth body extending outward along the periphery of the first row closing wheel and having an essentially flat surface and a beveled surface that are relatively narrower at a distal end of the tooth and wider proximally toward the center of the row closer wheel, each tooth having a profile characterized by essentially parallel lines substantially along the length of the tooth body, wherein during operation of a row planter the parallel lines are essentially parallel with a ground surface when rotating and exiting the ground surface so as to deter debris and soil material from collecting on the surface of the tooth.

10. The row closer wheel of claim 1, wherein the first set of teeth comprise 12 teeth separated sequentially by approximately 30 degrees relative to the center of the row closer wheel.

11. A row closing wheel for mounting to a row closing assembly for use in operation of a row planter and adapted to close a planting row, the row closing wheel comprising:
- a center, a front, a back, an inner circumference, and an outer circumference;
- a center hub base being a minor diameter on a first plane and defined by the inner circumference, the center hub base having a circular center hub opening at the center for mounting the row closing wheel to a row closer wheel mount assembly;
- a sloped body portion being a portion of a major diameter of the row closing wheel between the inner circumference and the outer circumference, the outer circumference being at a second plane offset from the inner circumference and the first plane relative to the front of the row closing wheel, the sloped body portion being at a slope angle relative to the first plane; and
- a first set of teeth arranged about the outer circumference of the first row closing wheel;
- wherein the center hub base and the sloped body portion form a gradual and continuous curve from the first plane to the second plane.

12. The row closing wheel of claim 11, wherein the slope angle is between 13 degrees and 15 degrees inclusive.

13. The row closing wheel of claim 11, wherein the offset of the outer circumference relative from the inner circumference relative to the first plane is 0.54 inches.

14. The row closing wheel of claim 11, wherein the major diameter is 9.54 inches.

15. The row closing wheel of claim 11, wherein the minor diameter is 4.75 inches.

16. The row closing wheel of claim 11, wherein the gradual and continuous curve from the first plane to the second plane is defined by a minor arc of a circle.

17. The row closing wheel of claim 11, wherein each of the first set of teeth include a tooth body extending outward along the periphery of the first row closing wheel and having an essentially flat surface and a beveled surface that are relatively narrower at a distal end of the tooth and wider proximally toward the center of the row closer wheel, each tooth having a profile characterized by essentially parallel lines substantially along the length of the tooth body, wherein during operation of a row planter the parallel lines are essentially parallel with a ground surface when rotating and exiting the ground surface so as to deter debris and soil material from collecting on the surface of the tooth.

18. The row closing wheel of claim 17, wherein the first set of teeth comprise 12 teeth separated sequentially by approximately 30 degrees relative to the center of the row closer wheel.

* * * * *